(12) United States Patent
Mizunuma et al.

(10) Patent No.: US 11,133,574 B2
(45) Date of Patent: Sep. 28, 2021

(54) COMMUNICATION DEVICE

(71) Applicant: Murata Manufacturing Co., Ltd., Kyoto (JP)

(72) Inventors: Ryuken Mizunuma, Kyoto (JP); Satoshi Tanaka, Kyoto (JP); Yasuhisa Yamamoto, Kyoto (JP); Akiko Itabashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/601,875

(22) Filed: Oct. 15, 2019

(65) Prior Publication Data
US 2020/0119432 A1 Apr. 16, 2020

(30) Foreign Application Priority Data

Oct. 16, 2018 (JP) .............................. JP2018-195347
Jul. 29, 2019 (JP) .............................. JP2019-139090

(51) Int. Cl.
*H01Q 1/24* (2006.01)
*H04B 7/0413* (2017.01)
*H01Q 1/22* (2006.01)
*G06F 1/16* (2006.01)

(52) U.S. Cl.
CPC ........... *H01Q 1/243* (2013.01); *G06F 1/1616* (2013.01); *G06F 1/1641* (2013.01); *G06F 1/1647* (2013.01); *H01Q 1/2266* (2013.01); *H04B 7/0413* (2013.01)

(58) Field of Classification Search
CPC .... H01Q 1/243; H01Q 1/2266; G06F 1/1616; G06F 1/1641; G06F 1/1647; H04B 7/0413
USPC ............................................ 455/575.3, 575.7
See application file for complete search history.

(56) References Cited

U.S. PATENT DOCUMENTS

| 9,723,434 | B1 * | 8/2017 | Chang | H04B 5/00 |
| 2006/0060762 | A1 * | 3/2006 | Chan | H04M 1/605 |
| | | | | 250/221 |
| 2015/0160698 | A1 | 6/2015 | Tsukamoto et al. | |
| 2018/0081398 | A1 * | 3/2018 | Shin | G06F 1/1677 |
| 2018/0088633 | A1 * | 3/2018 | Whitman | G06F 3/0446 |
| 2018/0366813 | A1 * | 12/2018 | Kim | H04M 1/0216 |
| 2019/0103656 | A1 * | 4/2019 | Shi | G06F 1/1683 |

FOREIGN PATENT DOCUMENTS

| JP | 2015-114673 A | 6/2015 |
| JP | 2018-121216 A | 8/2018 |

* cited by examiner

*Primary Examiner* — Lee Nguyen
(74) *Attorney, Agent, or Firm* — Pearne & Gordon LLP

(57) ABSTRACT

A communication device includes: a first body including a first display portion; a second body including a second display portion; a communication circuit that carries out millimeter-wave band communication; and one or more millimeter-wave band communication antennas provided in at least one of the first body and the second body.

23 Claims, 29 Drawing Sheets

COMMUNICATION DEVICE

This application claims priority from Japanese Patent Application No. JP2018-195347 filed on Oct. 16, 2018, and claims priority from Japanese Patent Application No. 2019-139090 filed on Jul. 29, 2019. The content of these applications are incorporated herein by reference in their entireties.

BACKGROUND OF THE DISCLOSURE

1. Field of the Disclosure

The present disclosure relates to a communication device.

2. Description of the Related Art

Mobile communication terminals, such as mobile phones and mobile information terminals, wireless LAN terminals, and other communication devices that accommodate multi-standard (multi-mode) communications are available. These communication devices are provided with multiple communication systems supporting the second-generation mobile communication system (hereinafter also simply referred to as "2G"), the third-generation mobile communication system (hereinafter also simply referred to as "3G"), and the fourth-generation mobile communication system (hereinafter also simply referred to as "4G"), which are based on different communications standards including Global System for Mobile Communications (GSM) (registered trademark), Wideband Code Division Multiple Access (W-CDMA), Long Term Evolution (LTE), and Bluetooth (registered trademark). These communication devices each provided with multiple communication systems to accommodate multi-mode communications carry out communication by using multiple frequency bands (multi-bands), with the multiple communication systems associated with respective frequency bands. As such a communication device, a foldable electronic device is disclosed in, for example, Japanese Unexamined Patent Application Publication No. 2015-114673.

There has been an effort toward adoption of the fifth-generation mobile communication system (hereinafter also simply referred to as "5G") as the latest communication standard for mobile terminals. The band covered by 5G is divided into "sub-6" for communication at a frequency of 6 GHz or lower and submillimeter-wave and millimeter-wave bands for high-frequency communication at a frequency of 24.25 GHz or higher. Communication circuits consume a lot of power particularly when carrying out communication in the submillimeter-wave and millimeter-wave bands, which may be used under limited conditions accordingly.

Communication devices supporting 5G need to include, in addition to communication circuits for 2G, 3G, and 4G and a communication circuit for WiFi communication, a communication circuit for communication in the sub-6 and the millimeter-wave bands to be used in 5G. In particular, antennas associated with such a communication circuit for millimeter-wave band communication need to be laid out in such a manner that the performance of the communication circuit may be fully exploited.

BRIEF SUMMARY OF THE DISCLOSURE

The present disclosure therefore has been made in view of the aforementioned circumstances, and it is an object of the present disclosure to provide a communication device in which the performance of a communication circuit for millimeter-wave band communication is fully exploited.

According to preferred embodiments of the present disclosure, a communication device includes: a first body including a first display portion; a second body including a second display portion; a communication circuit that carries out millimeter-wave band communication; and one or more millimeter-wave band communication antennas provided in at least one of the first body and the second body.

This configuration offers a high degree of flexibility in the layout of the one or more millimeter-wave band communication antennas and eases the constraints on the number of millimeter-wave band communication antennas to be provided. In the communication device having this configuration, the performance of the communication circuit for millimeter-wave band communication may be fully exploited.

Other features, elements, characteristics and advantages of the present disclosure will become more apparent from the following detailed description of preferred embodiments of the present disclosure (with reference to the attached drawings).

DETAILED DESCRIPTION OF THE DISCLOSURE

Hereinafter, communication devices according to embodiments of the present disclosure will be described in detail with reference to the drawings. The following embodiments should not be construed as limiting the scope of the present disclosure. The embodiments described herein are merely examples. Needless to say, it is possible to partially replace or combine the configurations illustrated according to different embodiments.

Embodiment 1

Figure 1:
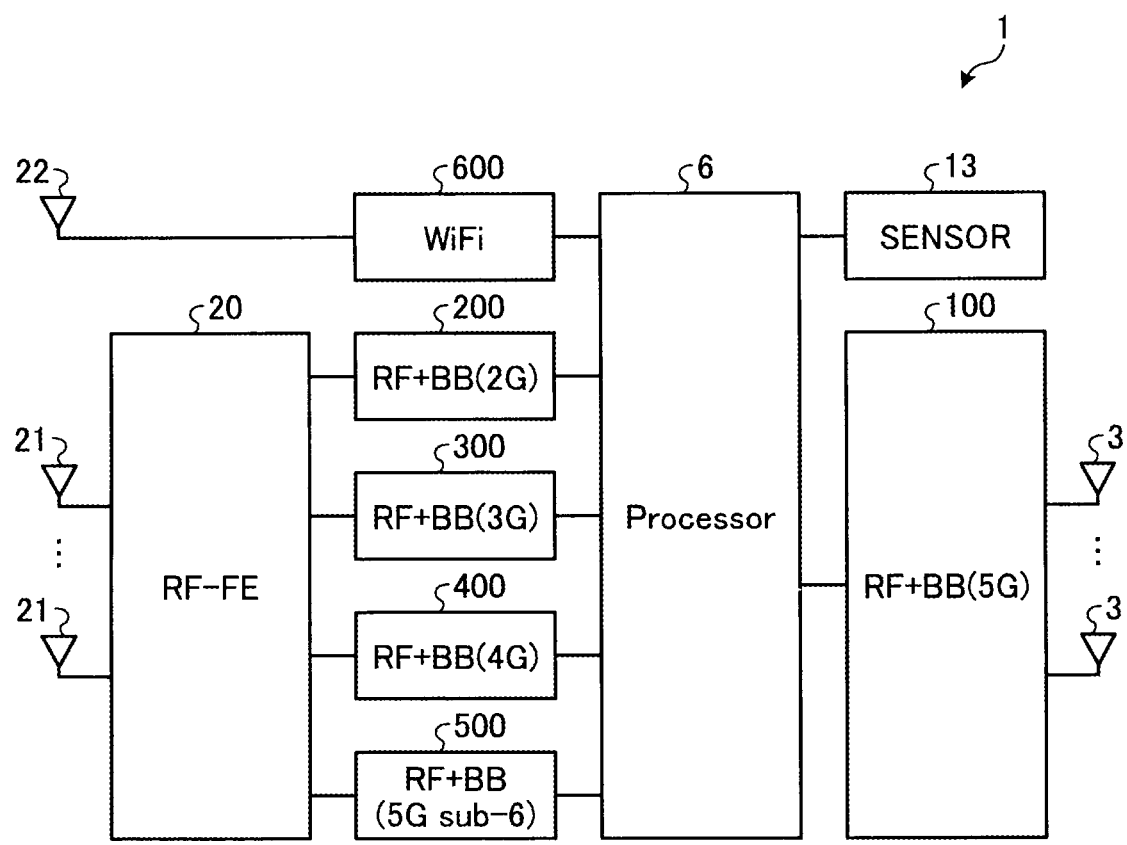
FIG. 1 is a block diagram illustrating the schematic configuration of a communication device according to Embodiment 1.

FIG. 1 is a block diagram illustrating the schematic configuration of a communication device according to Embodiment 1. As illustrated in FIG. 1, a communication device 1 according to the present embodiment includes a communication circuit (RF+BB (2G)) 200 for 2G, a communication circuit (RF+BB (3G)) 300 for 3G, a communication circuit (RF+BB (4G)) 400 for 4G, a communication circuit (RF+BB (5G sub-6)) 500 for 5G sub-6, a radio-frequency (RF) front-end circuit 20, radio-frequency (RF) antennas 21, a communication circuit 600 for WiFi communication, a WiFi antenna 22, a communication circuit 100 for 5G millimeter-wave band communication, millimeter-wave band communication antennas 3, a sensor 13, and a processor 6. According to the present disclosure, frequency bands for use in millimeter-wave band communication include, in addition to semimillimeter-wave and millimeter-wave bands such as 28 GHz band, 39 GHz band, and 60 GHz band, the following bands defined by IEEE: X-band (8 to 12 GHz), Ku-band (12 to 18 GHz), K-band (18 to 27 GHz), Ka-band (27 to 40 GHz), and V-band (40 to 75 GHz).

Figure 2:
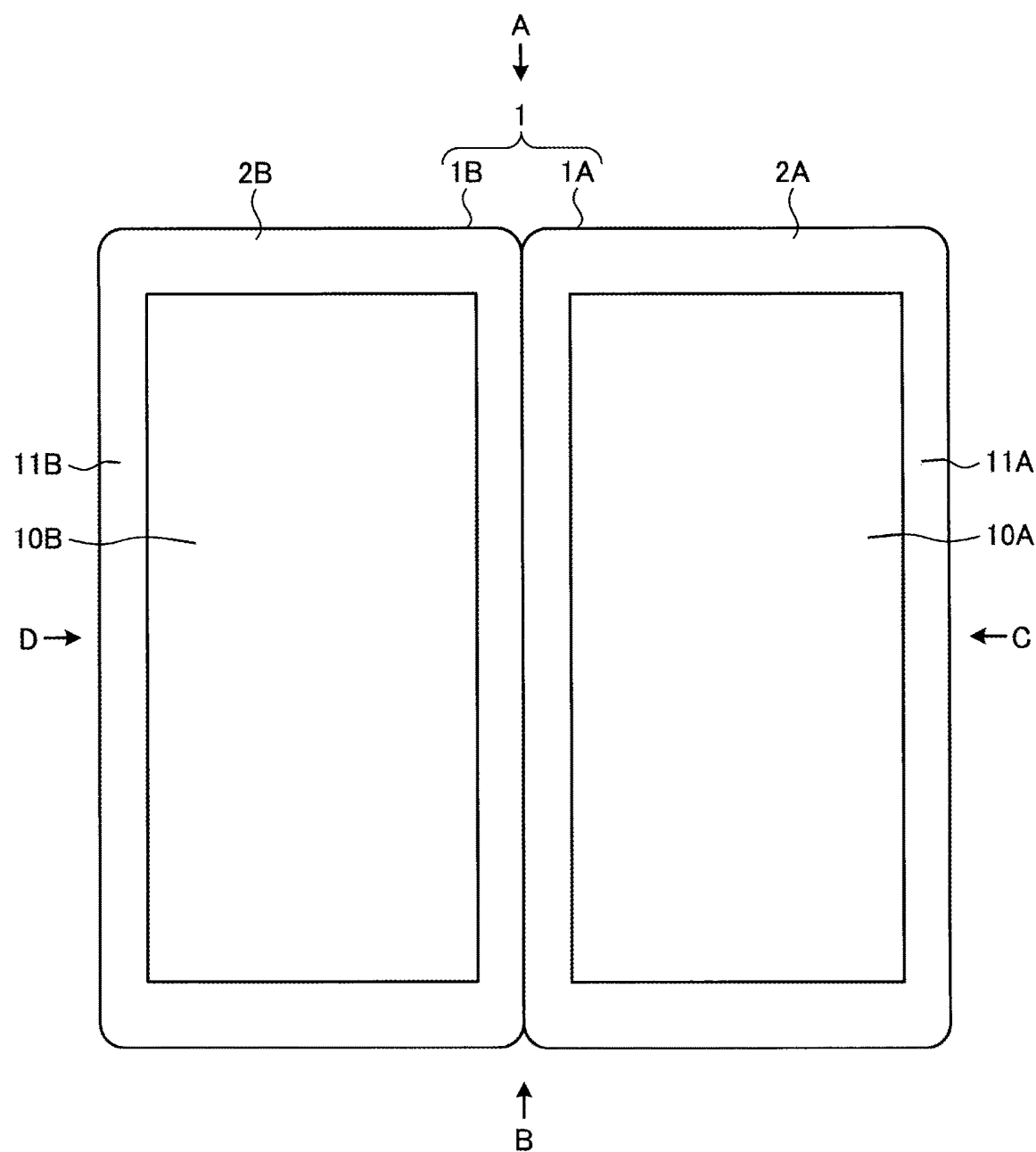
FIG. 2 is a plan view of an exemplary communication device according to Embodiment 1.

FIG. 2 is a plan view of an exemplary communication device according to Embodiment 1. As illustrated in FIG. 2, the communication device 1 in the present embodiment is intended as a foldable smartphone including a first body 1A and a second body 1B, which are connected to each other in such a manner that they can be laid on each other or laid side by side.

FIG. 2 is a plan view of the communication device 1 unfolded in such a manner that an angle of 180 degrees is formed between the first body 1A and the second body 1B, illustrating a first display portion 10A of the first body 1A and a second display portion 10B of the second body 1B. Referring to FIG. 2, a first display surface 2A is a surface in which the first display portion 10A is provided, a first frame region 11A is an outer region of the first display portion 10A of the first display surface 2A, a second display surface 2B is a surface in which the second display portion 10B is provided, and a second frame region 11B is an outer region of the second display portion 10B of the second display surface 2B.

Figure 3:
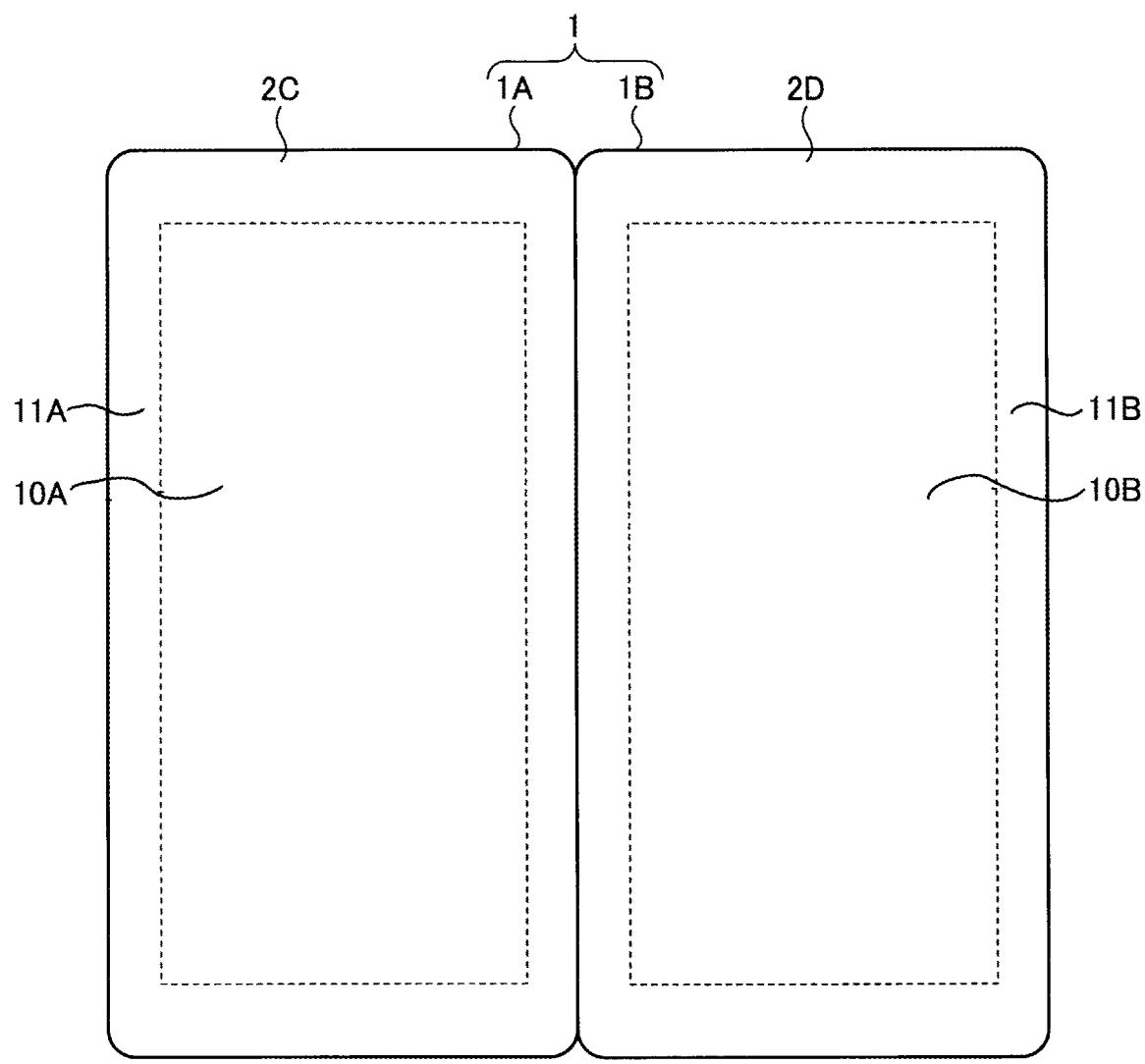
FIG. 3 is a back view of the communication device in FIG. 2.

FIG. 3 is a back view of the communication device in FIG. 2. Referring to FIG. 3, a first back surface 2C is a back surface of the first body 1A and a second back surface 2D is a back surface of the second body 1B.

Figure 4:
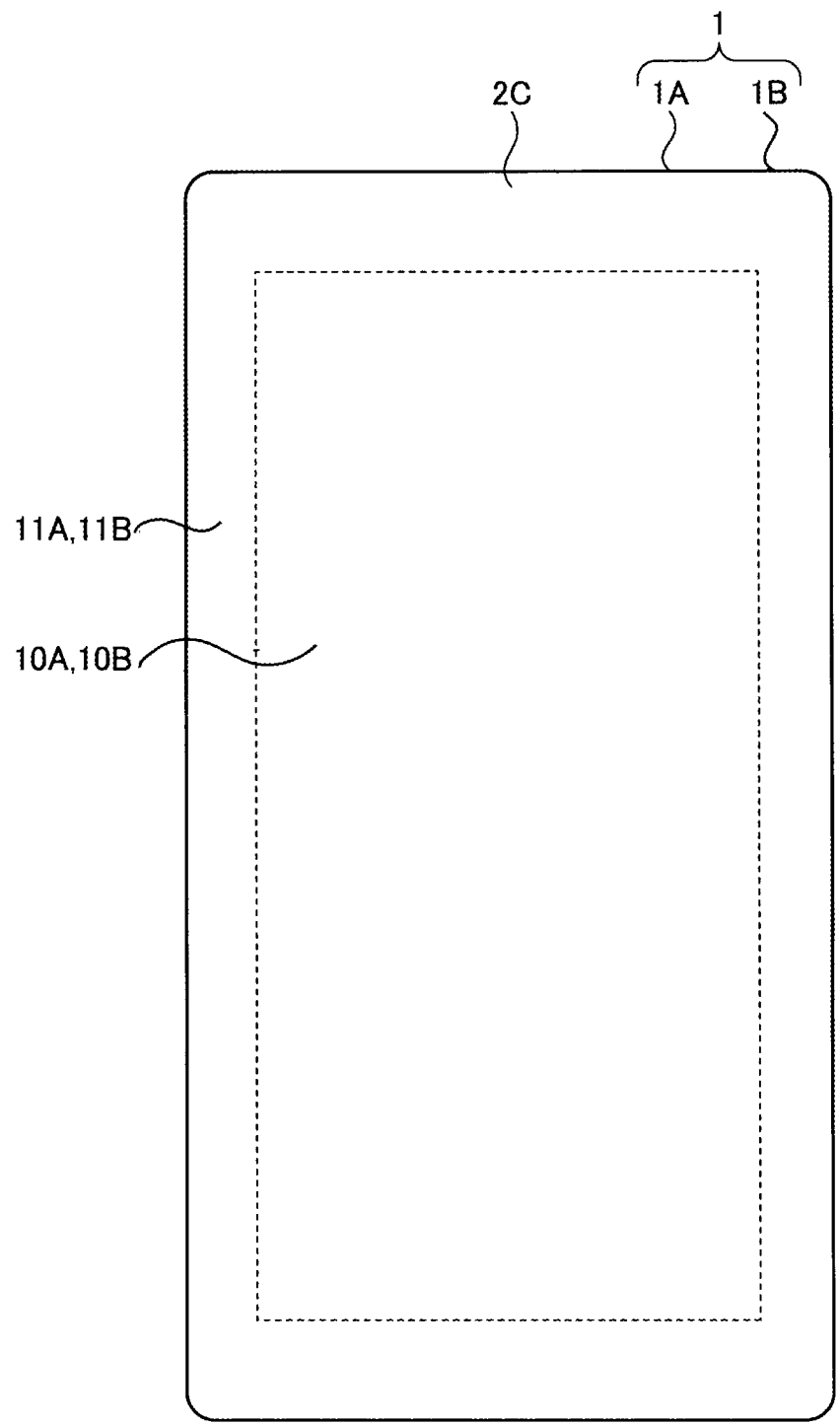
FIG. 4 is a plan view of the communication device in FIG. 2, illustrating a back surface of a first body of the communication device in a folded state.
Figure 5:
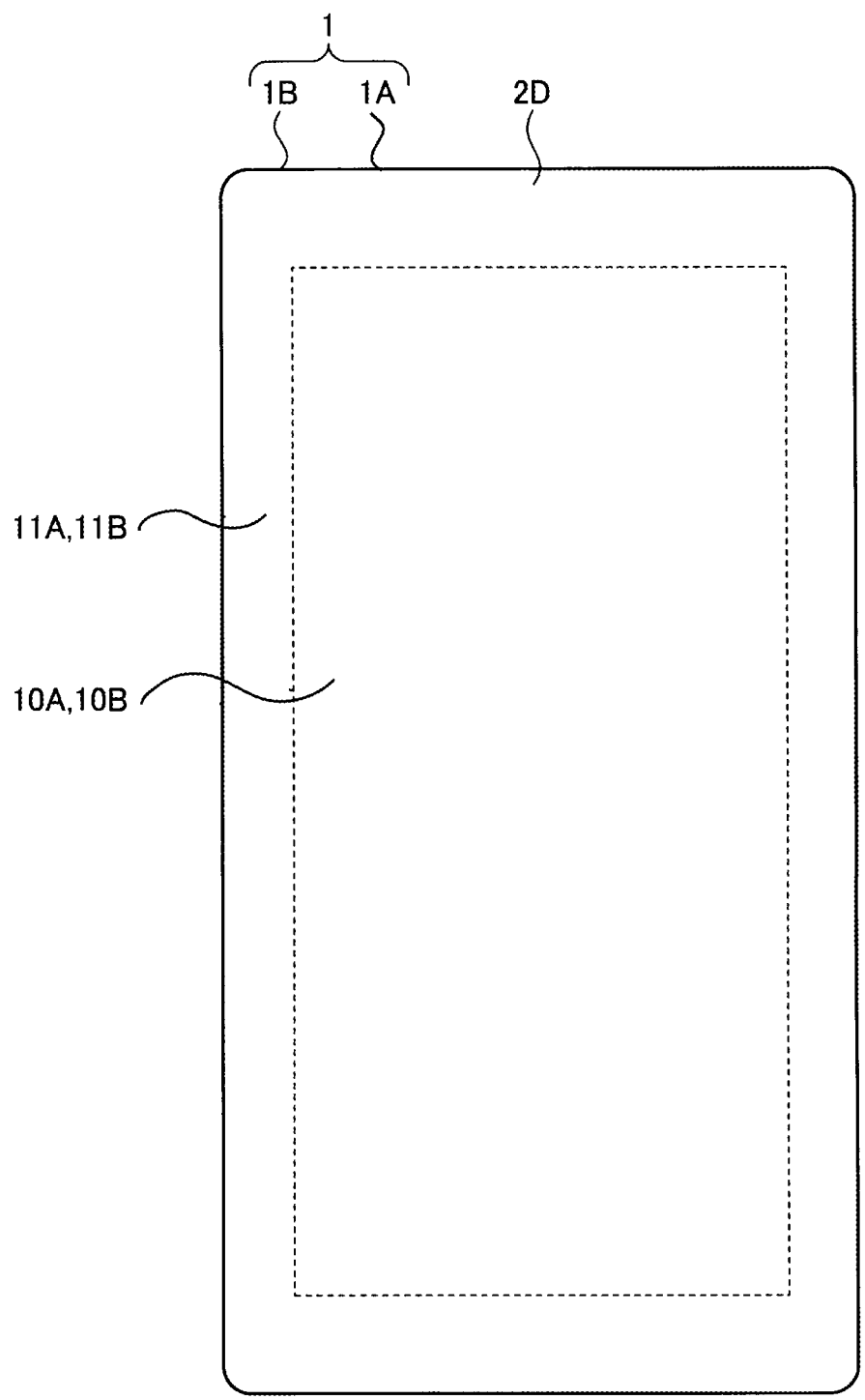
FIG. 5 is a plan view of the communication device in FIG. 2, illustrating a back surface of a second body of the communication device in the folded state.

FIG. 4 is a plan view of the communication device in FIG. 2, illustrating the back surface of the first body of the communication device in a folded state. FIG. 5 is a plan view of the communication device in FIG. 2, illustrating the back surface of the second body of the communication device in the folded state. The state in which the communication device 1 is folded in such a manner that the first display portion 10A faces the second display portion 10B as illustrated in FIGS. 4 and 5 is hereinafter also described as the "folded state" of the communication device 1.

Figure 6:
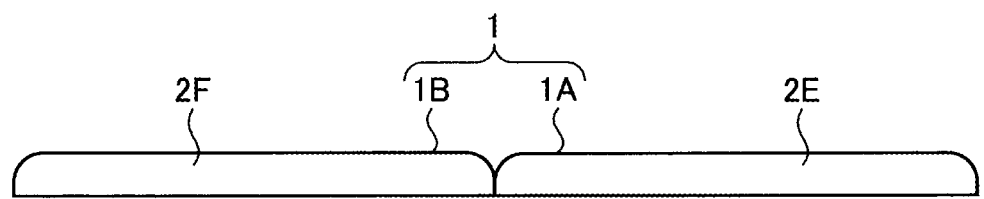
FIG. 6 is a top view of the communication device illustrated in FIG. 2 and seen in the direction of the arrow A.

FIG. 6 is a top view of the communication device illustrated in FIG. 2 and seen in the direction of the arrow A. Referring to FIG. 6, a first top surface 2E is a top surface of the first body 1A and a second top surface 2F is a top surface of the second body 1B.

Figure 7:
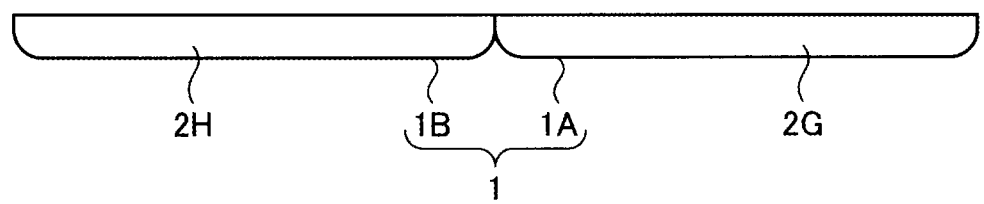
FIG. 7 is a bottom view of the communication device illustrated in FIG. 2 and seen in the direction of the arrow B.

FIG. 7 is a bottom view of the communication device illustrated in FIG. 2 and seen in the direction of the arrow B. Referring to FIG. 7, a first bottom surface 2G is a bottom surface of the first body 1A and a second bottom surface 2H is the bottom surface of the second body 1B.

Figure 8:
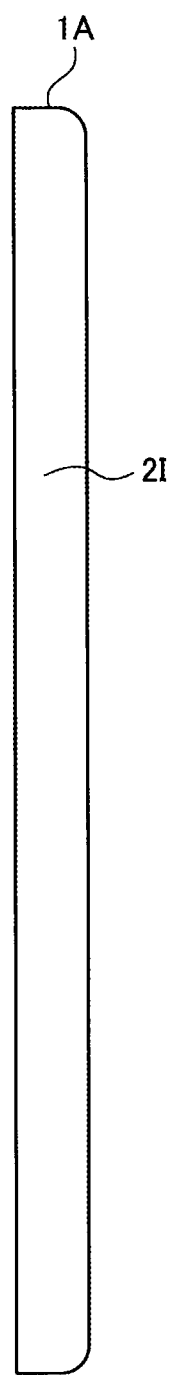
FIG. 8 is a side view of the communication device illustrated in FIG. 2 and seen in the direction of the arrow C.

FIG. 8 is a side view of the communication device illustrated in FIG. 2 and seen in the direction of the arrow C. Referring to FIG. 8, a first side surface 2I is a side surface of the first body 1A.

Figure 9:
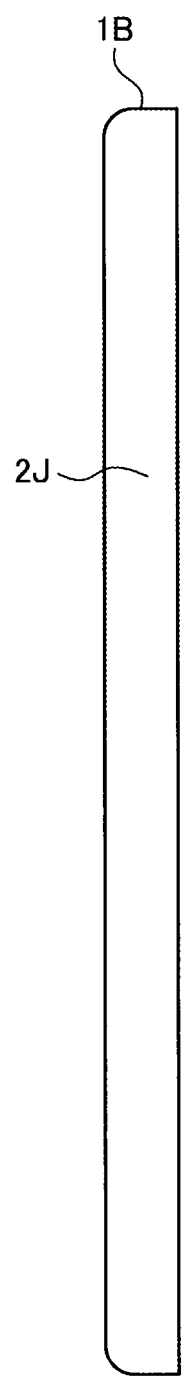
FIG. 9 is a side view of the communication device illustrated in FIG. 2 and seen in the direction of the arrow D.

FIG. 9 is a side view of the communication device illustrated in FIG. 2 and seen in the direction of the arrow D. Referring to FIG. 9, a second side surface 2J is a side surface of the second body 1B.

In each of the configurations illustrated in FIGS. 2 to 9, the communication circuit 100 is provided in the first body 1A or the second body 1B. In each of the configurations illustrated in FIGS. 2 to 9, the communication device 1 includes, as in FIG. 1, the sensor 13, which senses the folded state of the communication device 1. The sensor 13 will be described later.

Figure 10A:
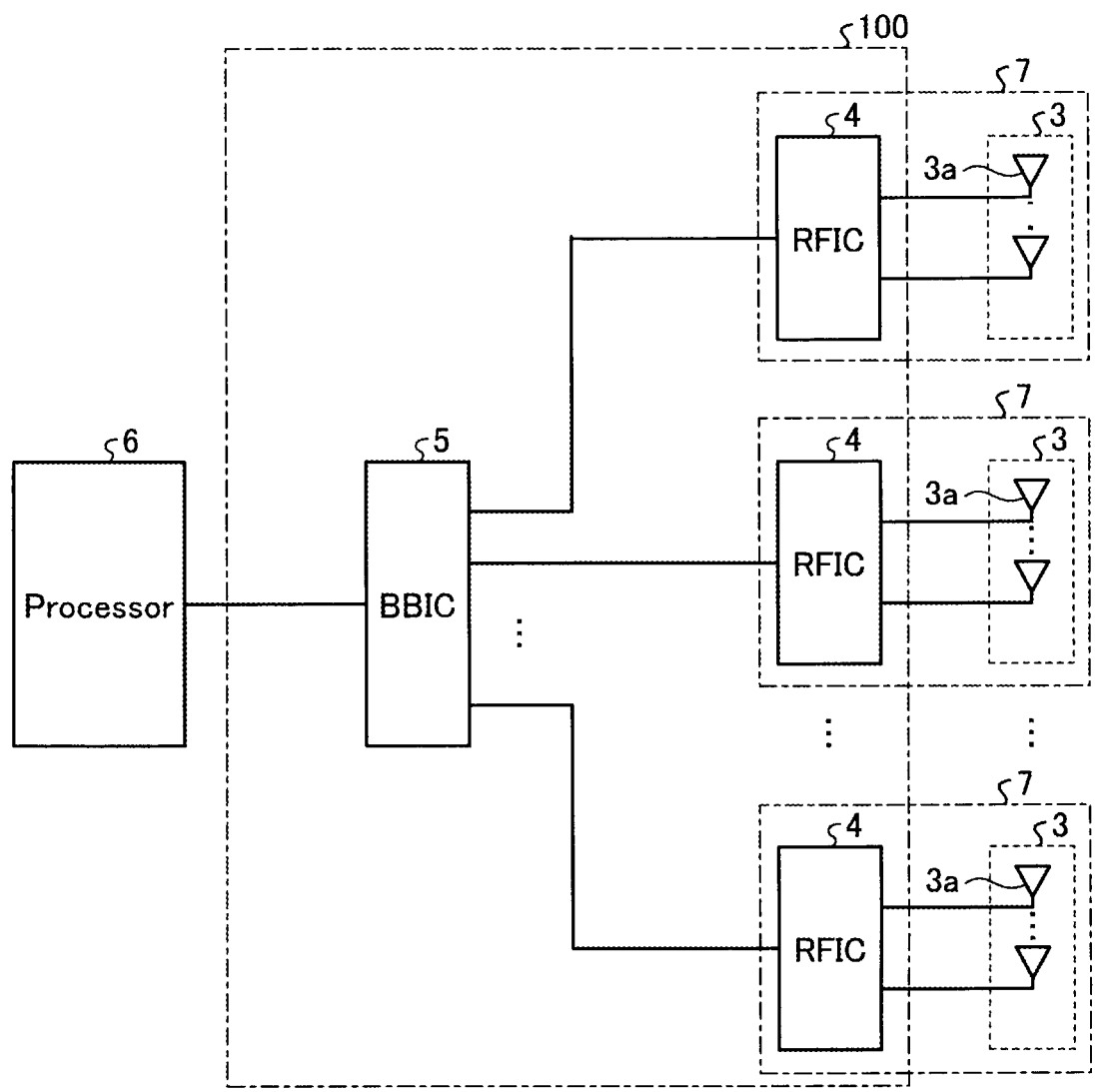
FIG. 10A is a block diagram illustrating a first example of a communication circuit for 5G millimeter-wave band communication.
Figure 10B:
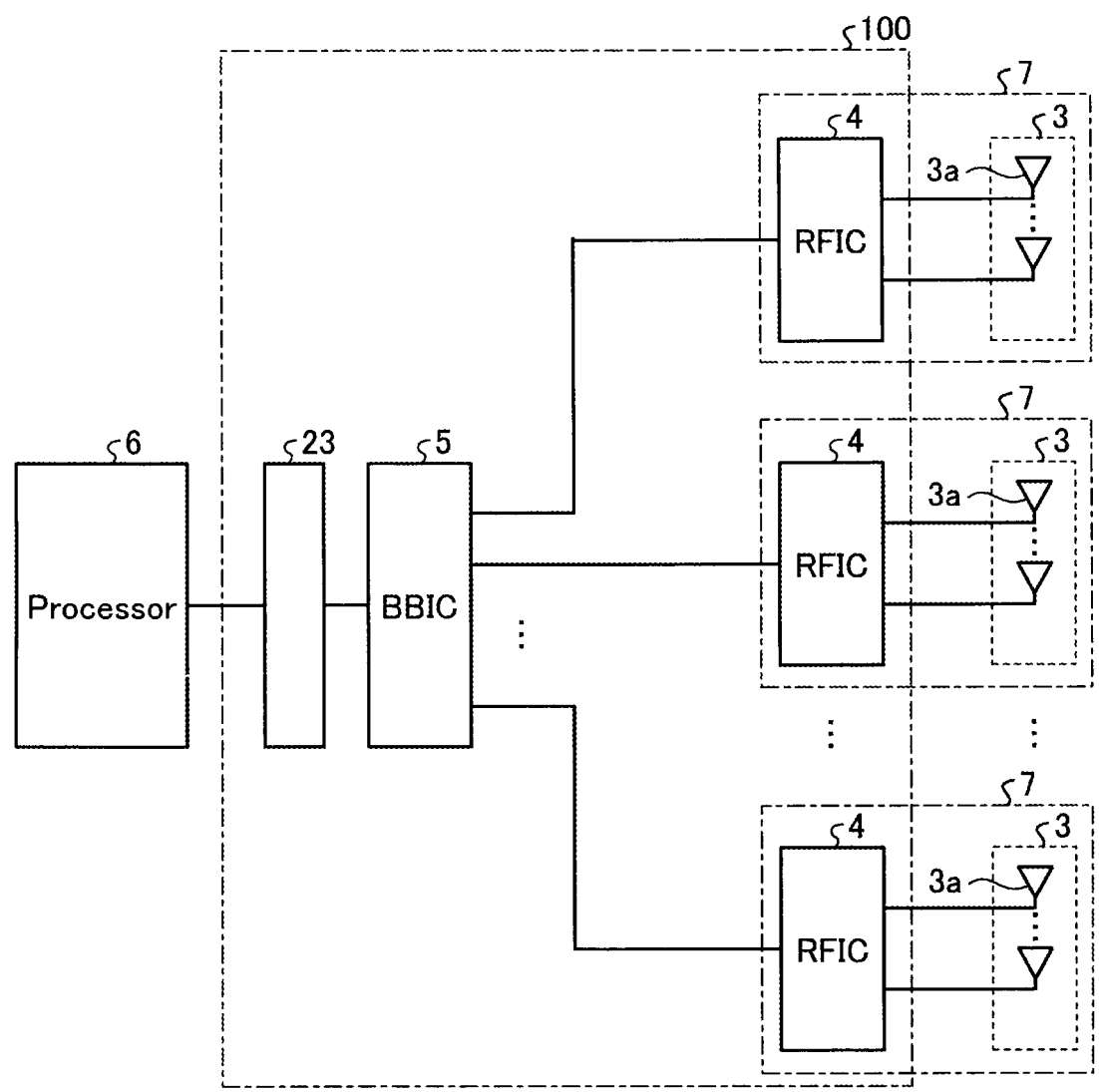
FIG. 10B is a block diagram illustrating a second example of the communication circuit for 5G millimeter-wave band communication.

FIG. 10A is a block diagram illustrating a first example of the communication circuit for 5G millimeter-wave band communication. FIG. 10B is a block diagram illustrating a second example of the communication circuit for 5G millimeter-wave band communication.

As illustrated in FIGS. 10A and 10B, the communication circuit 100 includes, for example, radio-frequency integrated circuits (RFICs) 4 that process radio-frequency signals and a baseband integrated circuit (BBIC) 5 that processes baseband signals.

Each millimeter-wave band communication antenna 3 includes patch antennas 3a. As illustrated in FIGS. 10A and 10B, the millimeter-wave band communication antenna 3 and the RFIC 4 in the present disclosure are combined into an RF module 7. The millimeter-wave band communication antenna 3 and the RF module 7 will be described later.

FIGS. 10A and 10B illustrates configurations in which multiple RF modules 7 are provided. In each of the configurations illustrated in FIGS. 10A and 10B, the communication circuit 100 may carry out millimeter-wave band communication under the multiple-input multiple-output (MIMO) scheme to enhance the communication speed in such a manner that the multiple RF modules 7 simultaneously transmit and receive different millimeter-wave band signals. Alternatively, in each of the configurations illustrated in FIGS. 10A and 10B, the communication circuit 100 may carry out millimeter-wave band communication under the diversity scheme to enhance the communication quality and reliability in such a manner that the multiple RF modules 7 simultaneously receive the same millimeter-wave band signals and an RF module in a better reception state is then selected from the multiple RF modules 7 and is used to carry out the communication.

As illustrated in FIG. 10B, a conversion circuit 23 may be disposed on a transmission path between the processor 6 and the BBIC 5. For example, a serial transmission line may form a connection between the processor 6 and the communication circuit 100. In this case, the conversion circuit 23 may be configured to perform serial/parallel conversion. Alternatively, the transmission between the processor 6 and the communication circuit 100 may be accomplished by optical fiber communication. In this case, the conversion circuit 23 may be configured to perform optical/electrical signal conversion. For example, the communication circuit 100 and the millimeter-wave band communication antennas 3 are provided in one body and the remaining components such as the processor 6 are provided in the other body. This may add structural constraints to the transmission path between the two bodies. As a workaround, the configuration illustrated in 10B may be adopted. In some embodiments, the communication device includes more than one communication circuits 100 and more than one millimeter-wave band communication antennas 3. In a case where each of the first body 1A and the second body 1B includes one or more communication circuits 100 and one or more millimeter-wave band communication antennas 3, the first body 1A or the second body 1B includes the processor 6. In one body including the processor 6, one or more communication circuits 100 may be connected to the processor 6 as illustrated in FIG. 10A. One or more communication circuits 100 in the other body, which does not include the processor 6, may be connected to the processor 6 of the one body as illustrated in FIG. 10B. The present disclosure is not limited to the manner in which the processor 6 is connected to the one or more communication circuits 100.

Figure 11A:
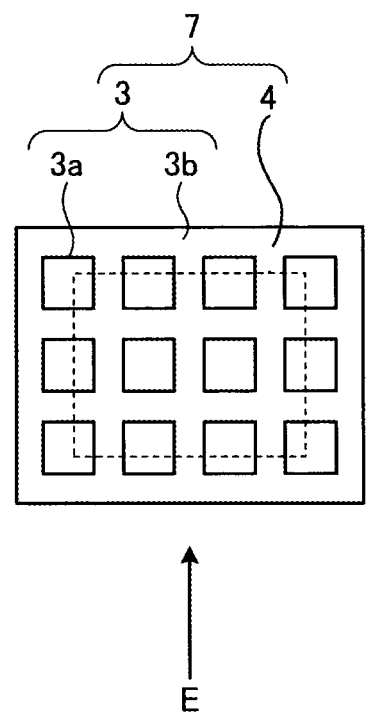
FIG. 11A is a view of an exemplary RF module in the communication device according to Embodiment 1.
Figure 11B:
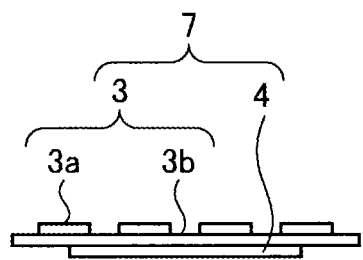
FIG. 11B is a view of the RF module illustrated in FIG. 11A and seen in the direction of the arrow E.

FIG. 11A is a view of an exemplary RF module in the communication device according to Embodiment 1. FIG. 11B is a view of the RF module illustrated in FIG. 11A and seen in the direction of the arrow E.

As illustrated in FIGS. 11A and 11B, the millimeter-wave band communication antenna 3 in the present embodiment is an array antenna including the patch antennas 3a arranged on the surface of a dielectric substrate 3b. Each patch antenna 3a is a radiation conductor disposed on the surface of the dielectric substrate 3b.

Substrates that may be used as the dielectric substrate 3b include: a low-temperature co-fired ceramic (LTCC) multi-layer substrate; a multilayer resin substrate including epoxy layers, polyimide layers, or other resin layers stacked on top of one another; a multilayer resin substrate including resin layers made from liquid crystal polymer (LCP) of lower dielectric constant and stacked on top of one another; a multilayer resin substrate including fluororesin layers stacked on top of one another; and a ceramic multilayer substrate (other than low-temperature co-fired ceramic substrates).

The RF module 7 is constructed in such a manner that the RFIC 4 is disposed on a back surface of the dielectric substrate 3b, that is, the RFIC 4 is disposed on the surface opposite to the surface on which the patch antennas 3a are disposed.

Although FIGS. 11A and 11B illustrate an example in which the millimeter-wave band communication antenna 3 and the RFIC 4 are combined into the RF module 7, it is not always required that the millimeter-wave band communication antenna 3 and the RFIC 4 be combined into one unit. Although the patch antennas 3a illustrated in FIGS. 11A and 11B are arranged in a four-by-three matrix, the matrix size of the patch antennas 3a may be varied.

FIGS. 12 to 21 illustrate example layouts of one or more millimeter-wave band communication antennas 3. Each of the millimeter-wave band communication antennas 3 and the patch antennas 3a illustrated in FIGS. 12 to 21 is merely an example and may be sized differently.

Figure 12:
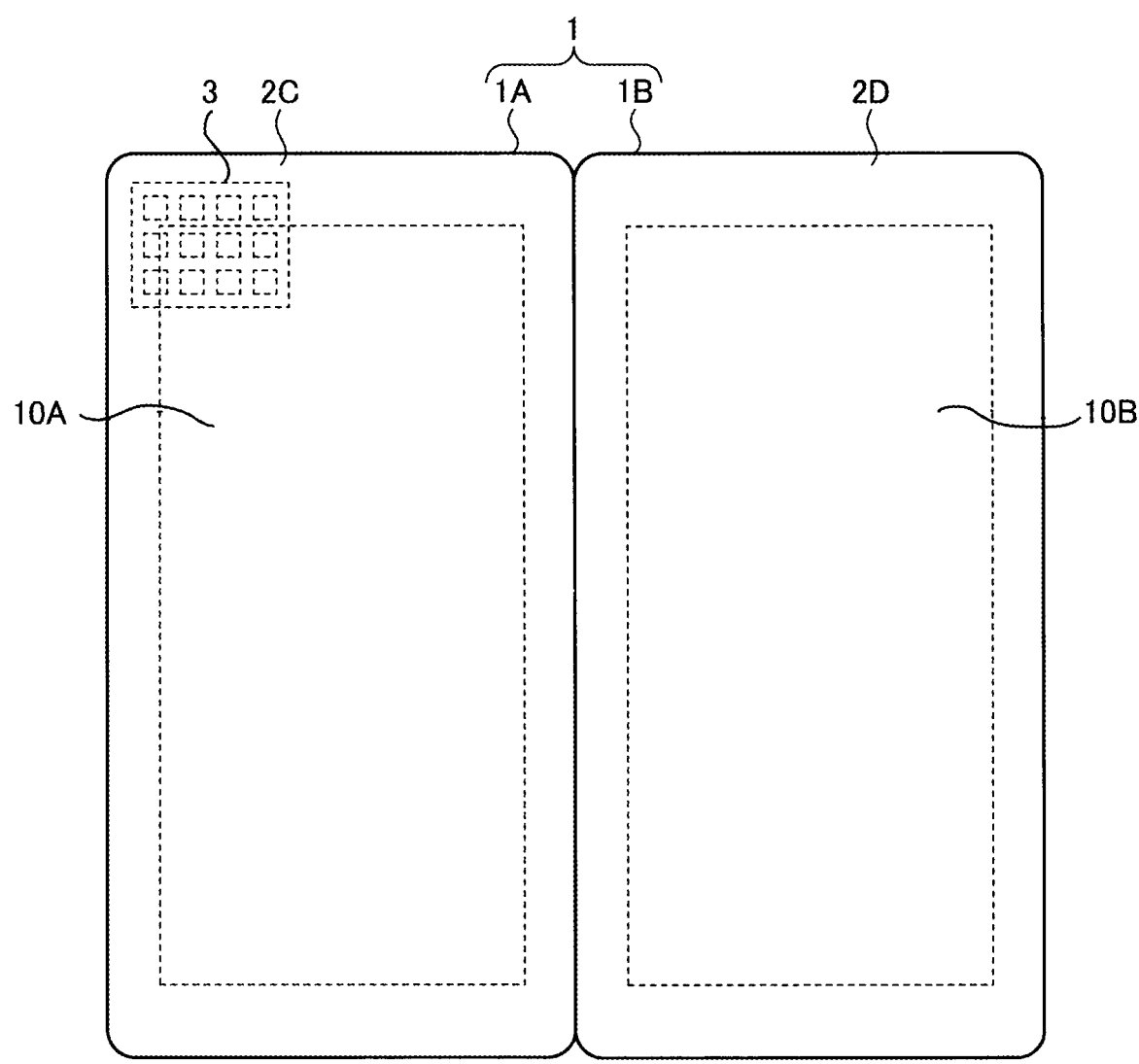
FIG. 12 illustrates an example in which one millimeter-wave band communication antenna is provided in a first back surface.
Figure 13:
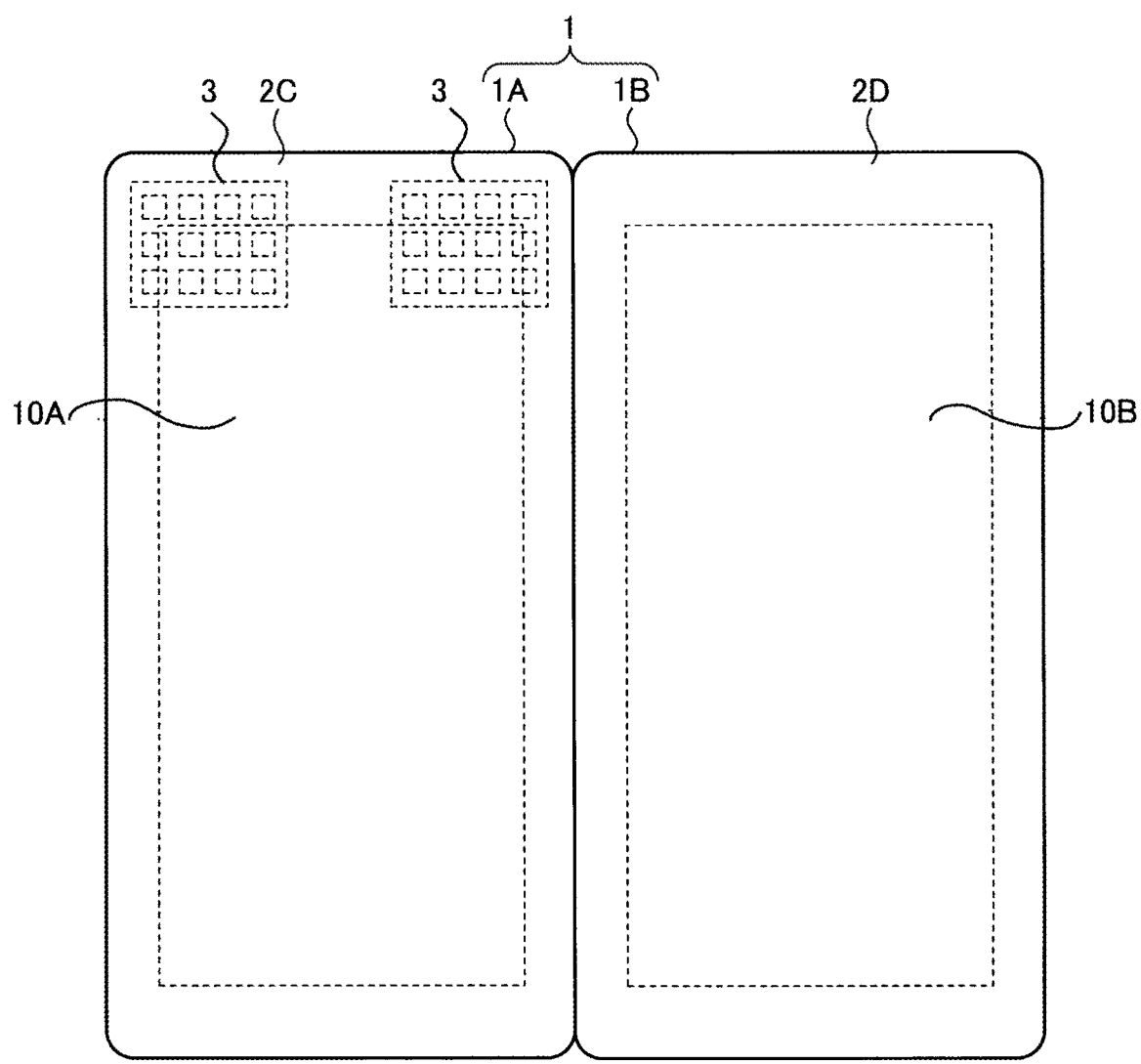
FIG. 13 illustrates an example in which two millimeter-wave band communication antennas are provided in the first back surface.
Figure 14:
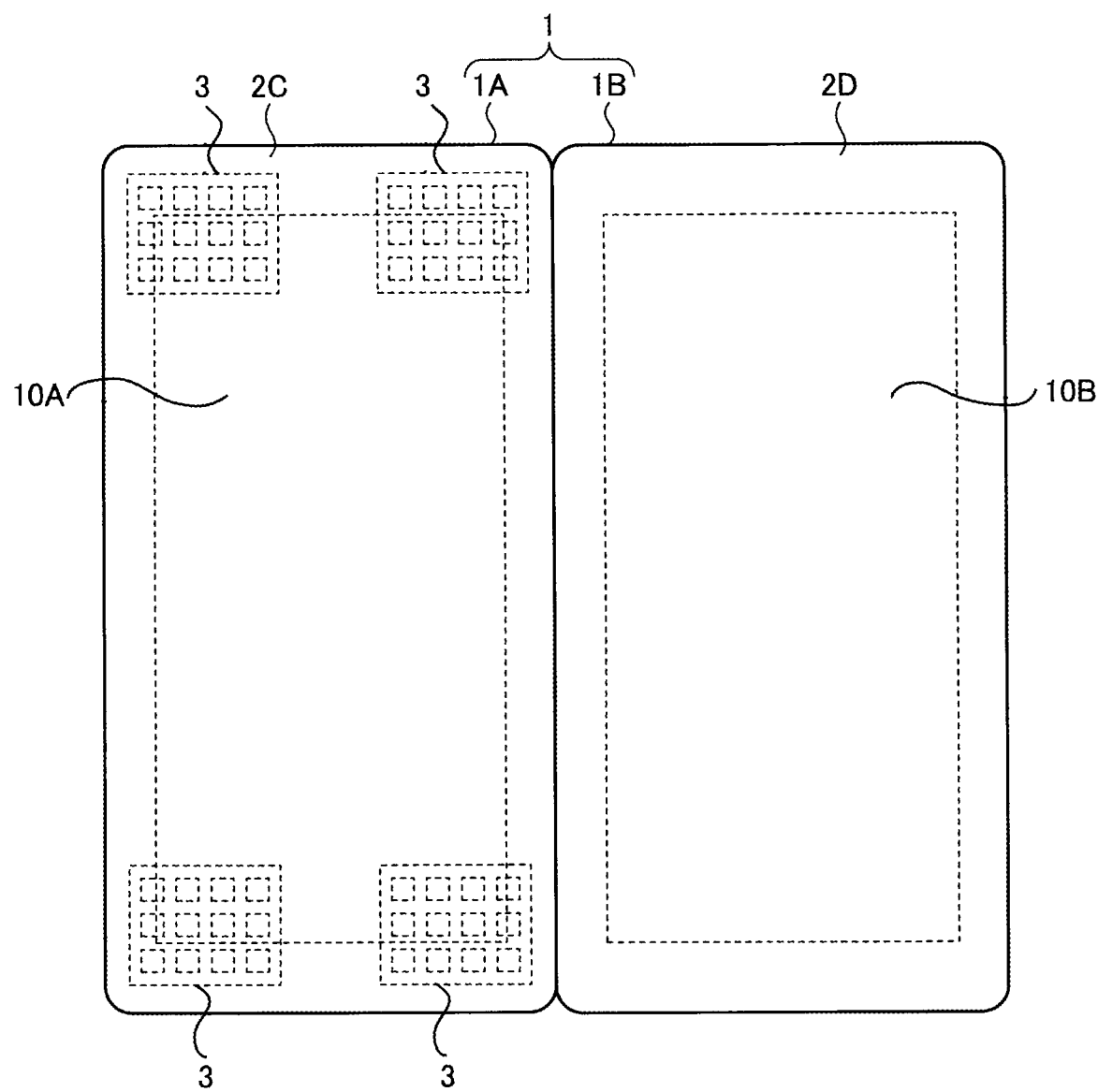
FIG. 14 illustrates an example in which four millimeter-wave band communication antennas are provided in the first back surface.
Figure 15:
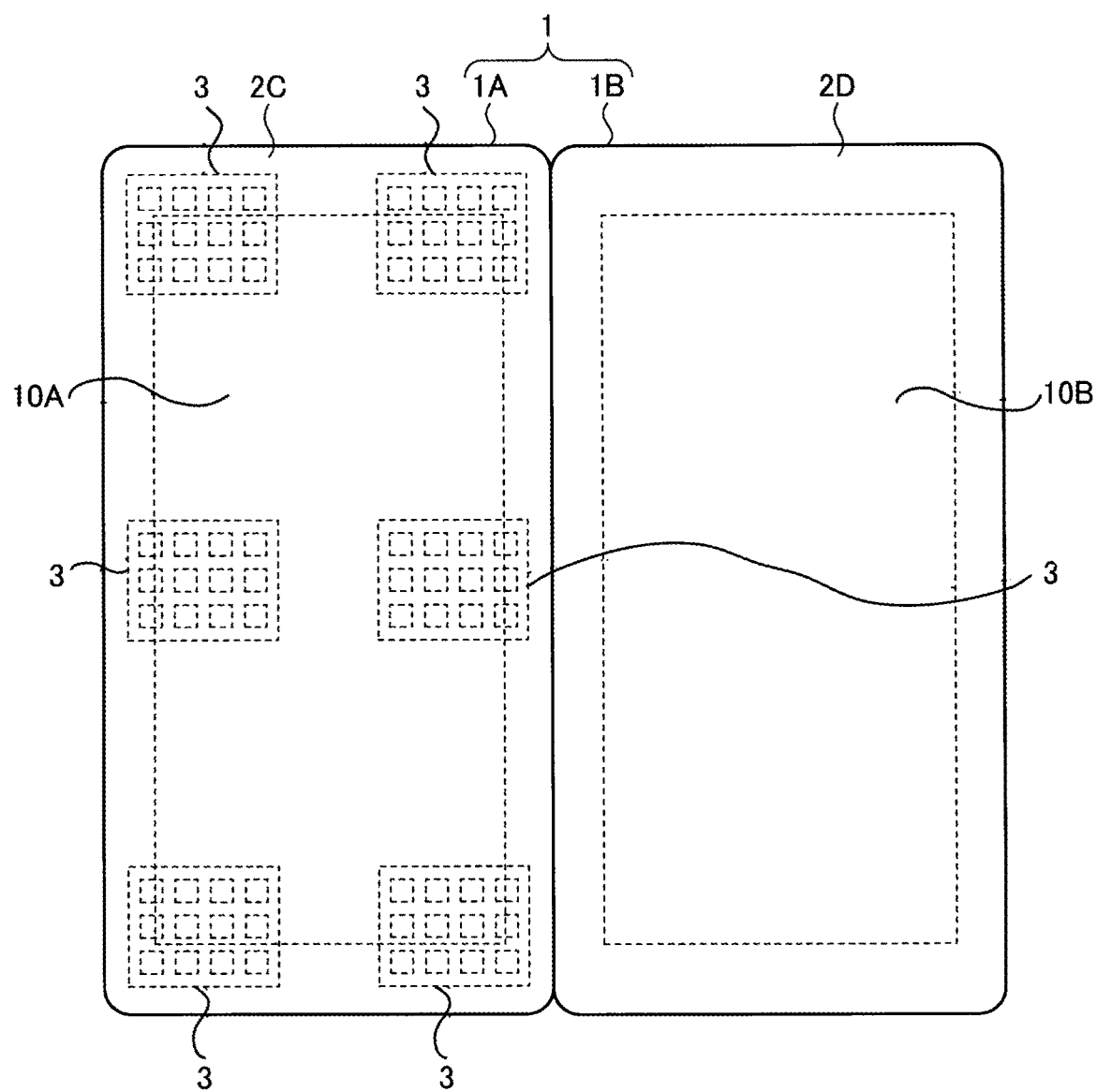
FIG. 15 illustrates an example in which six millimeter-wave band communication antennas are provided in the first back surface.

FIG. 12 illustrates an example in which one millimeter-wave band communication antenna is provided in the first back surface. FIG. 13 illustrates an example in which two millimeter-wave band communication antennas are provided in the first back surface. FIG. 14 illustrates an example in which four millimeter-wave band communication antennas are provided in the first back surface. FIG. 15 illustrates an example in which six millimeter-wave band communication antennas are provided in the first back surface.

Although FIGS. 12 to 15 illustrate examples in which one or more millimeter-wave band communication antennas 3 are provided in the first back surface 2C, one or more millimeter-wave band communication antennas 3 may be provided in the second back surface 2D, or at least one of the millimeter-wave band communication antennas 3 may be provided in the first back surface 2C with the remainder provided in the second back surface 2D. The number of millimeter-wave band communication antennas 3 provided in the first back surface 2C or the second back surface 2D is not limited to one, two, four, and six as illustrated respectively in FIGS. 12, 13, 14, and 15.

Figure 16:
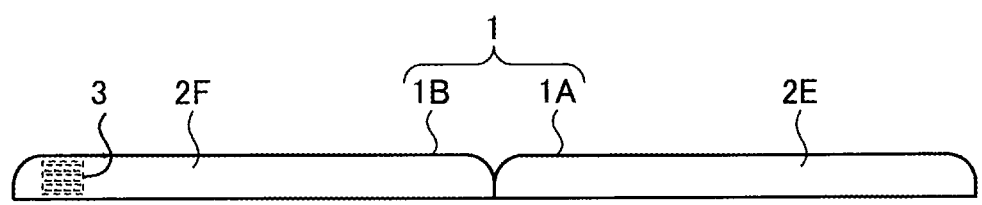
FIG. 16 illustrates an example in which one millimeter-wave band communication antenna is provided in a second top surface.

FIG. 16 illustrates an example in which one millimeter-wave band communication antenna is provided in the second top surface.

Although FIG. 16 illustrates an example in which one millimeter-wave band communication antenna 3 is provided in the second top surface 2F, more than one millimeter-wave band communication antennas 3 may be provided in the second top surface 2F. Alternatively, one or more millimeter-wave band communication antennas 3 may be provided in the first top surface 2E, or at least one of the millimeter-wave band communication antennas 3 may be provided in the first top surface 2E with the remainder provided in the second top surface 2F.

Figure 17:
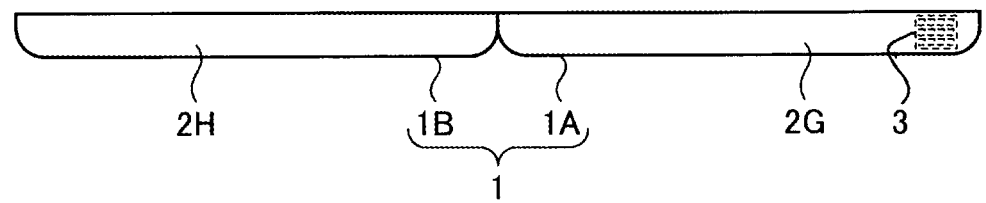
FIG. 17 illustrates an example in which one millimeter-wave band communication antenna is provided in a first bottom surface.

FIG. 17 illustrates an example in which one millimeter-wave band communication antenna is provided in the first bottom surface.

Although FIG. 17 illustrates an example in which one millimeter-wave band communication antenna 3 is provided in the first bottom surface 2G, more than one millimeter-wave band communication antennas 3 may be provided in the first bottom surface 2G. Alternatively, one or more millimeter-wave band communication antennas 3 may be provided in the second bottom surface 2H, or at least one of the millimeter-wave band communication antennas 3 may be provided in the first bottom surface 2G with the remainder provided in the second bottom surface 2H.

Figure 18:
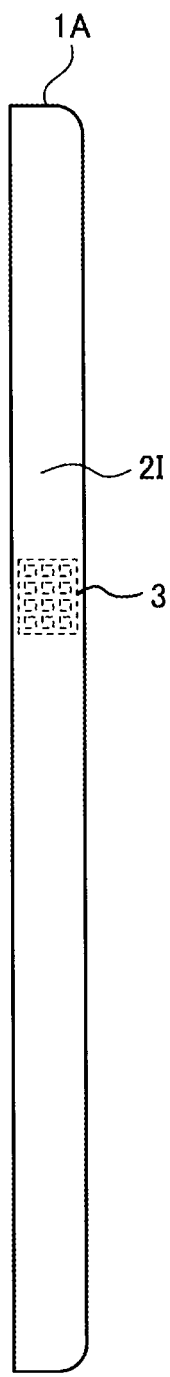
FIG. 18 illustrates an example in which one millimeter-wave band communication antenna is provided in a first side surface.

FIG. 18 illustrates an example in which one millimeter-wave band communication antenna is provided in the first side surface.

Although FIG. 18 illustrates an example in which one millimeter-wave band communication antenna 3 is provided in the first side surface 2I, more than one millimeter-wave band communication antennas 3 may be provided in the first side surface 2I.

Figure 19:
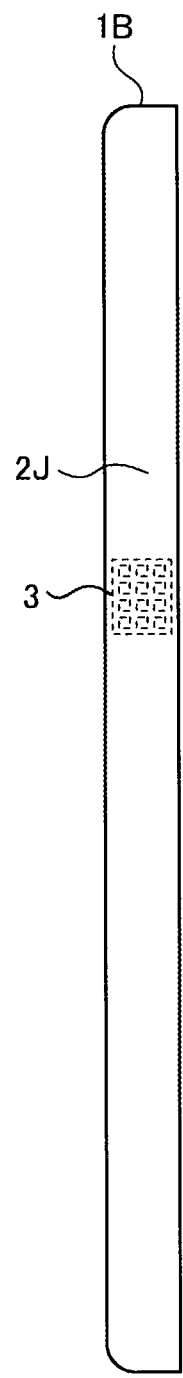
FIG. 19 illustrates an example in which one millimeter-wave band communication antenna is provided in a second side surface.

FIG. 19 illustrates an example in which one millimeter-wave band communication antenna is provided in the second side surface.

Although FIG. 19 illustrates an example in which one millimeter-wave band communication antenna 3 is provided in the second side surface 2J, more than one millimeter-wave band communication antennas 3 may be provided in the second side surface 2J.

Figure 20:
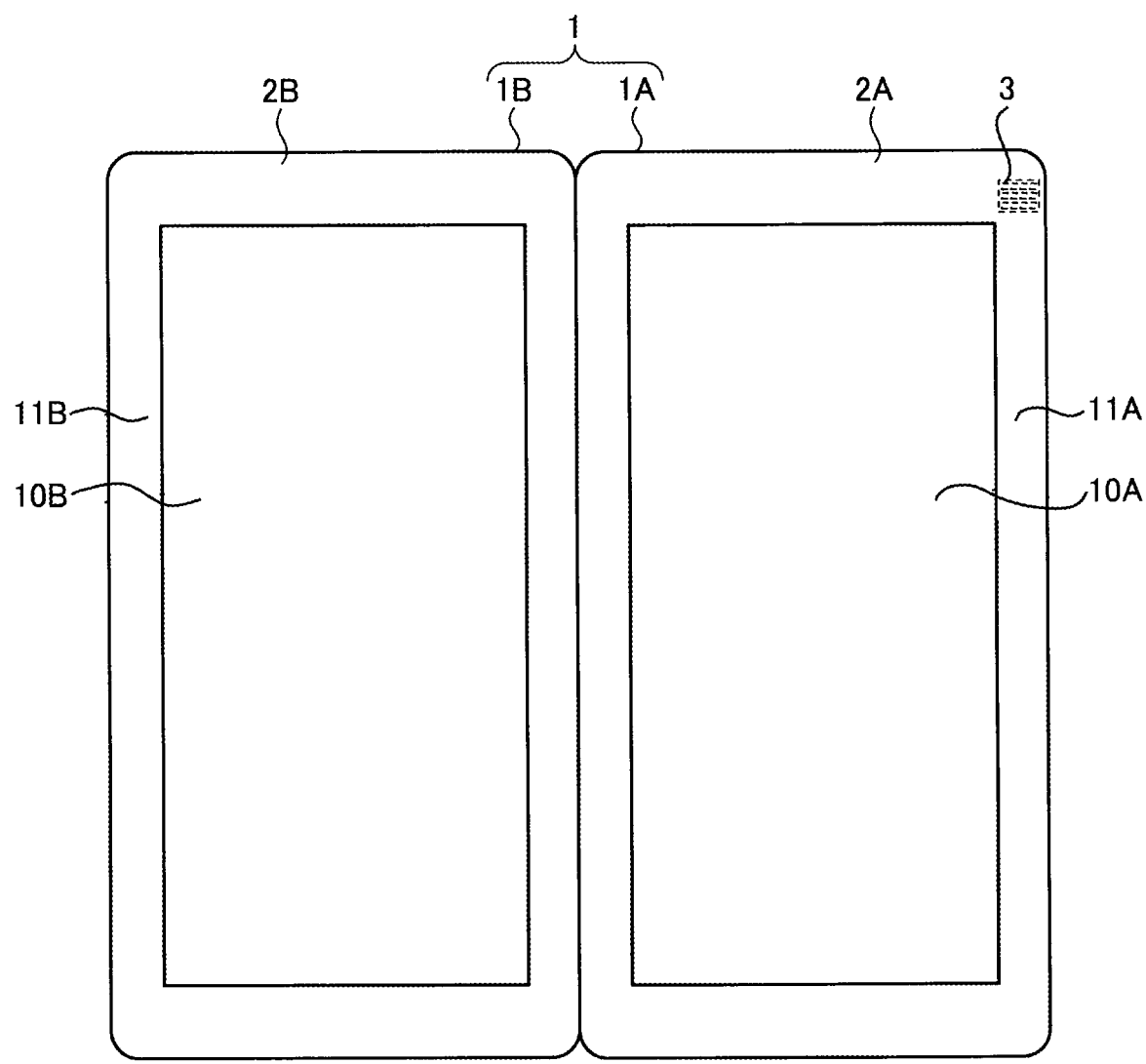
FIG. 20 illustrates an example in which one millimeter-wave band communication antenna is provided in a first frame region.
Figure 21:
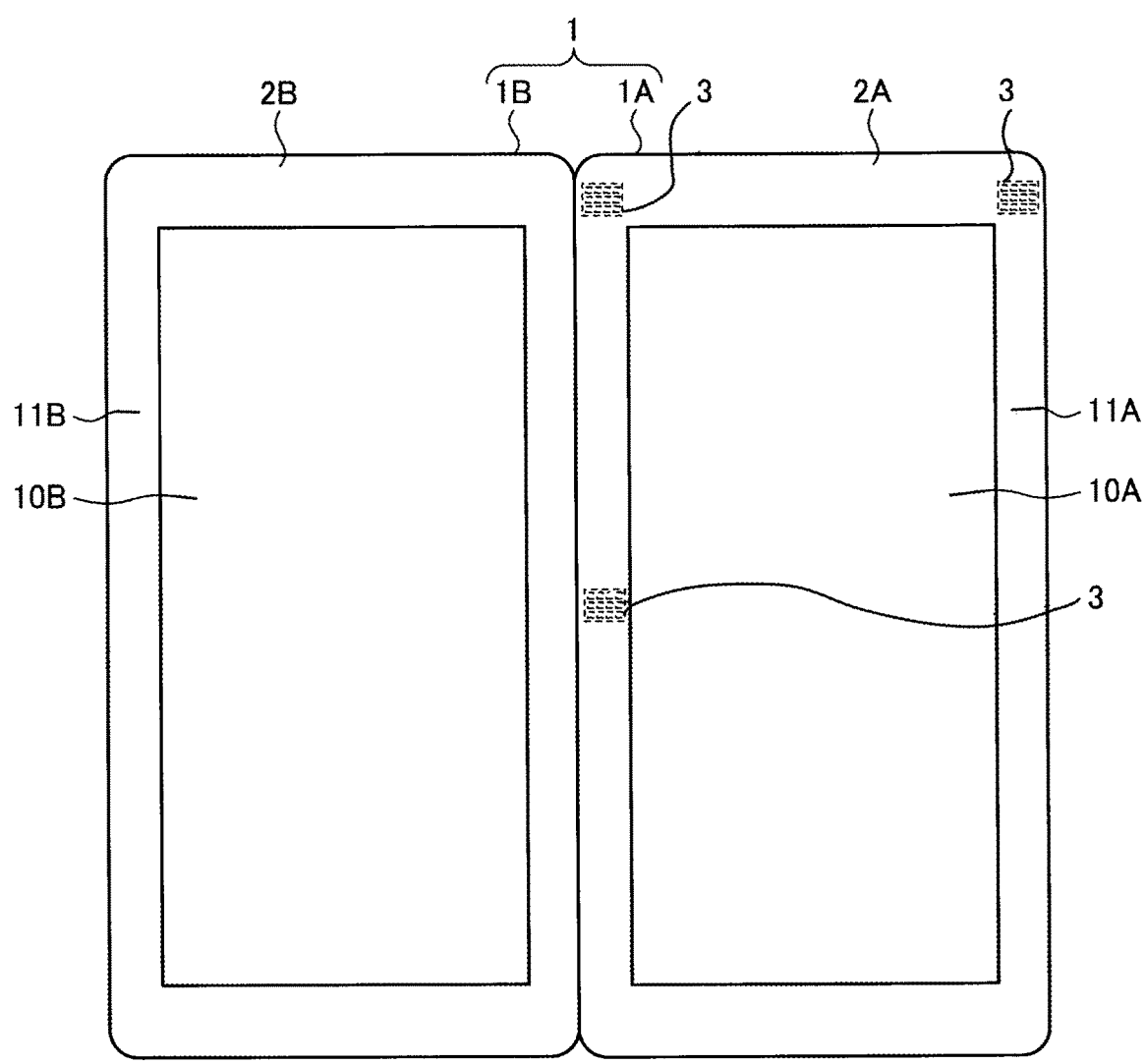
FIG. 21 illustrates an example in which three millimeter-wave band communication antennas are provided in the first frame region.

FIG. 20 illustrates an example in which one millimeter-wave band communication antenna is provided in the first frame region. FIG. 21 illustrates an example in which three millimeter-wave band communication antennas are provided in the first frame region.

Although FIGS. 20 to 21 illustrate examples in which one or more millimeter-wave band communication antennas 3 are provided in the first frame region 11A, one or more millimeter-wave band communication antennas may be provided in the second frame region 11B, or at least one of the millimeter-wave band communication antennas 3 may be provided in the first frame region 11A with the remainder provided the second frame region 11B. The number of millimeter-wave band communication antennas 3 provided in the first frame region 11A or the second frame region 11B is not limited to one as illustrated in FIG. 20 or to three as illustrated in FIG. 21.

As described above, the communication device 1 according to the present embodiment includes the communication circuit 100 for communication in the millimeter-wave bands to be used in 5G in addition to the communication circuit 200 for 2G, the communication circuit 300 for 3G, the communication circuit 400 for 4G, the communication circuit 500 for 5G sub-6, and the communication circuit 600 for WiFi communication. It is difficult to maintain the quality of millimeter-wave band communication due to the limitations of the space available for one or more millimeter-wave band communication antennas 3 in such a configuration.

The communication device 1 in the present embodiment is intended as a foldable smartphone including the first body 1A and the second body 1B, which are connected to each other in such a manner that they can be laid on each other or laid side by side. As illustrated in FIGS. 12 to 21, this configuration offers a high degree of flexibility in the layout of the one or more millimeter-wave band communication antennas 3 and eases the constraints on the number of millimeter-wave band communication antennas 3 to be provided. As described above, providing the multiple millimeter-wave band communication antennas 3 and the multiple RFICs 4 to enable millimeter-wave band communication under the MIMO scheme or under the diversity scheme will enhance the communication speed, the communication quality, and the reliability of the millimeter-wave band communication. This configuration also offers a high degree of flexibility in the layout of the patch antennas 3*a* constituting the millimeter-wave band communication antenna 3 and enables precise beamforming accordingly. Thus, the performance of the communication circuit for millimeter-wave band communication may be fully exploited in the communication device 1.

Embodiment 2

The first body 1A or the second body 1B of the communication device 1 includes a battery. In the body including the battery, the limited space is available for the millimeter-wave band communication antennas 3. When the millimeter-wave band communication antennas 3 are provided in the body that does not include a battery, the space in the smartphone may be well-utilized with no space wasted.

Embodiment 3

Figure 22A:
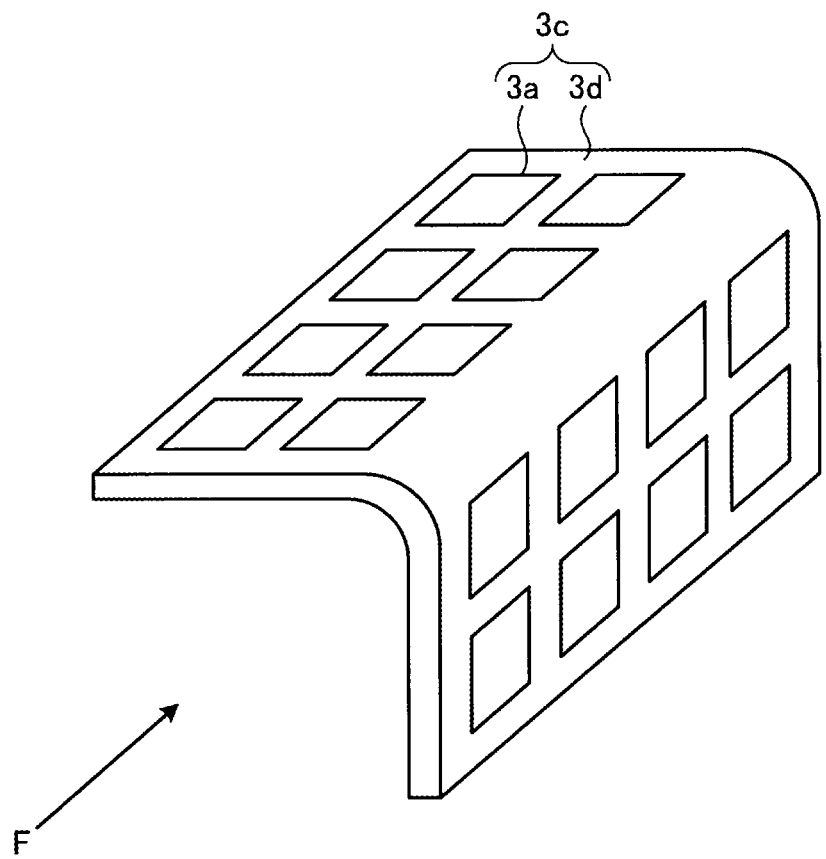
FIG. 22A is a view of an exemplary RF module in the communication device according to Embodiment 3.
Figure 22B:
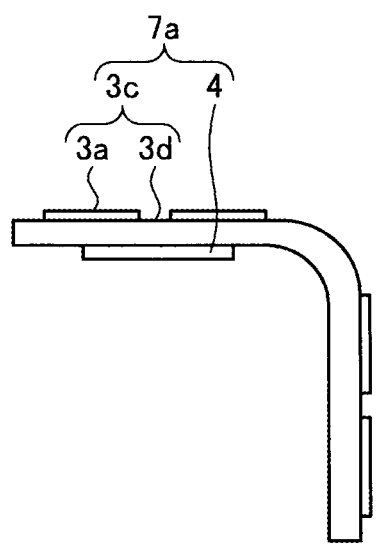
FIG. 22B is a view of the RF module illustrated in FIG. 22A and seen in the direction of the arrow F.

FIG. 22A is a view of an exemplary RF module in the communication device according to Embodiment 3. FIG. 22B is a view of the RF module illustrated in FIG. 22A and seen in the direction of the arrow F.

As illustrated in FIG. 22A, the millimeter-wave band communication antenna 3*c* in the present embodiment is an array antenna including the patch antennas 3*a* arranged on the surface of a flexible substrate 3*d*. Each patch antenna 3*a* is a radiation conductor disposed on the surface of the flexible substrate 3*d*, which is so flexible that it can be bent as desired.

As illustrated in FIG. 22B, an RF module 7*a* is constructed in such a manner that the RFIC 4 is disposed on a back surface of the flexible substrate 3*d*, that is, the RFIC 4 is disposed on the surface opposite to the surface on which the patch antennas 3*a* are disposed.

Although FIGS. 22A and 22B illustrate an example in which the millimeter-wave band communication antenna 3*c* and the RFIC 4 are combined into the RF module 7*a*, it is not always required that the millimeter-wave band communication antenna 3*c* and the RFIC 4 be combined into one unit. Although the patch antennas 3*a* illustrated in FIGS. 22A and 22B are arranged in a four-by-four matrix, the matrix size of the patch antennas 3*a* may be varied. For example, the patch antennas 3*a* arranged in two two-by-four matrices may be provided.

Figure 23:
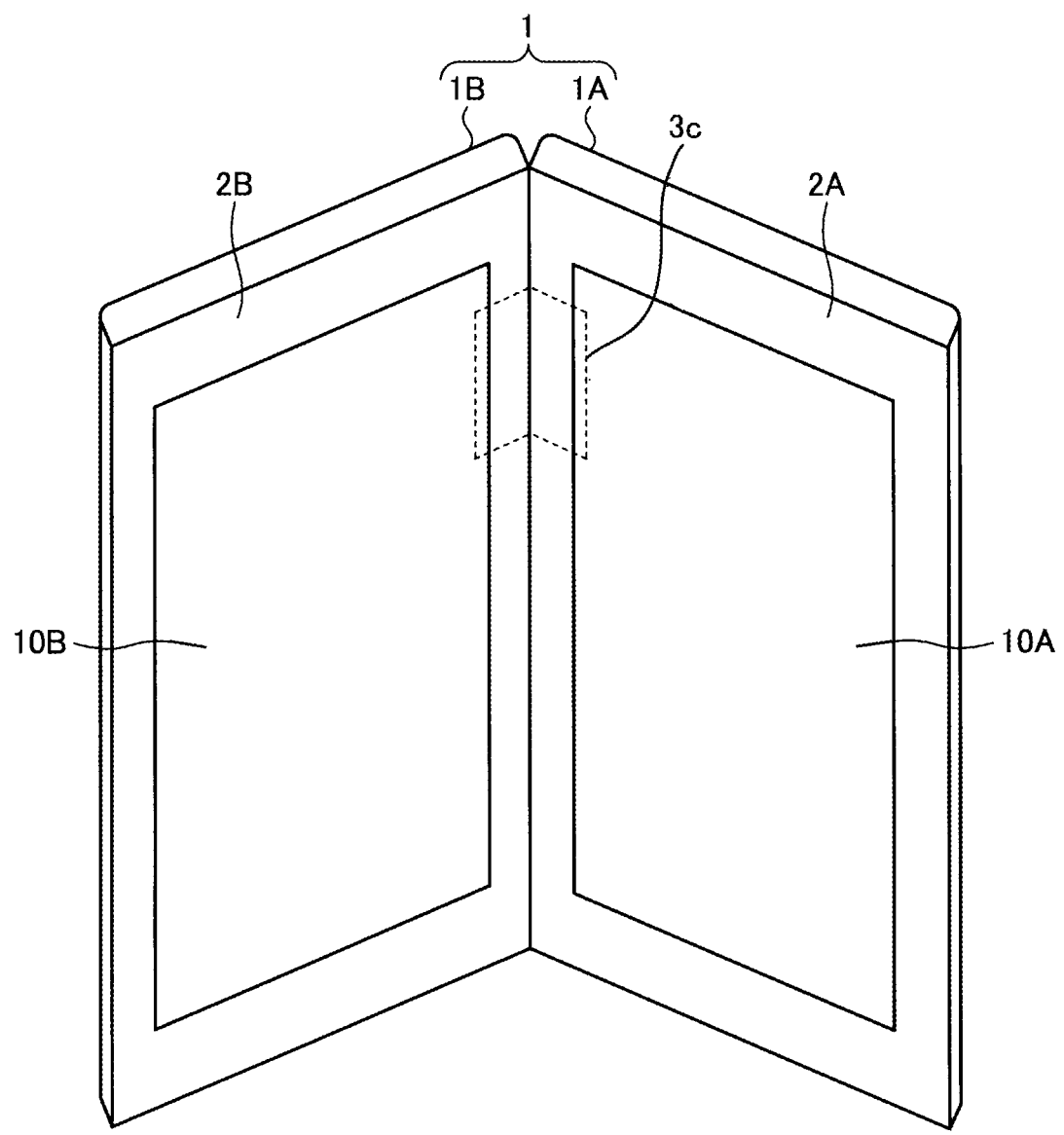
FIG. 23 illustrates an example in which one millimeter-wave band communication antenna is disposed on a flexible substrate forming a connection between the first body and the second body.
Figure 24:
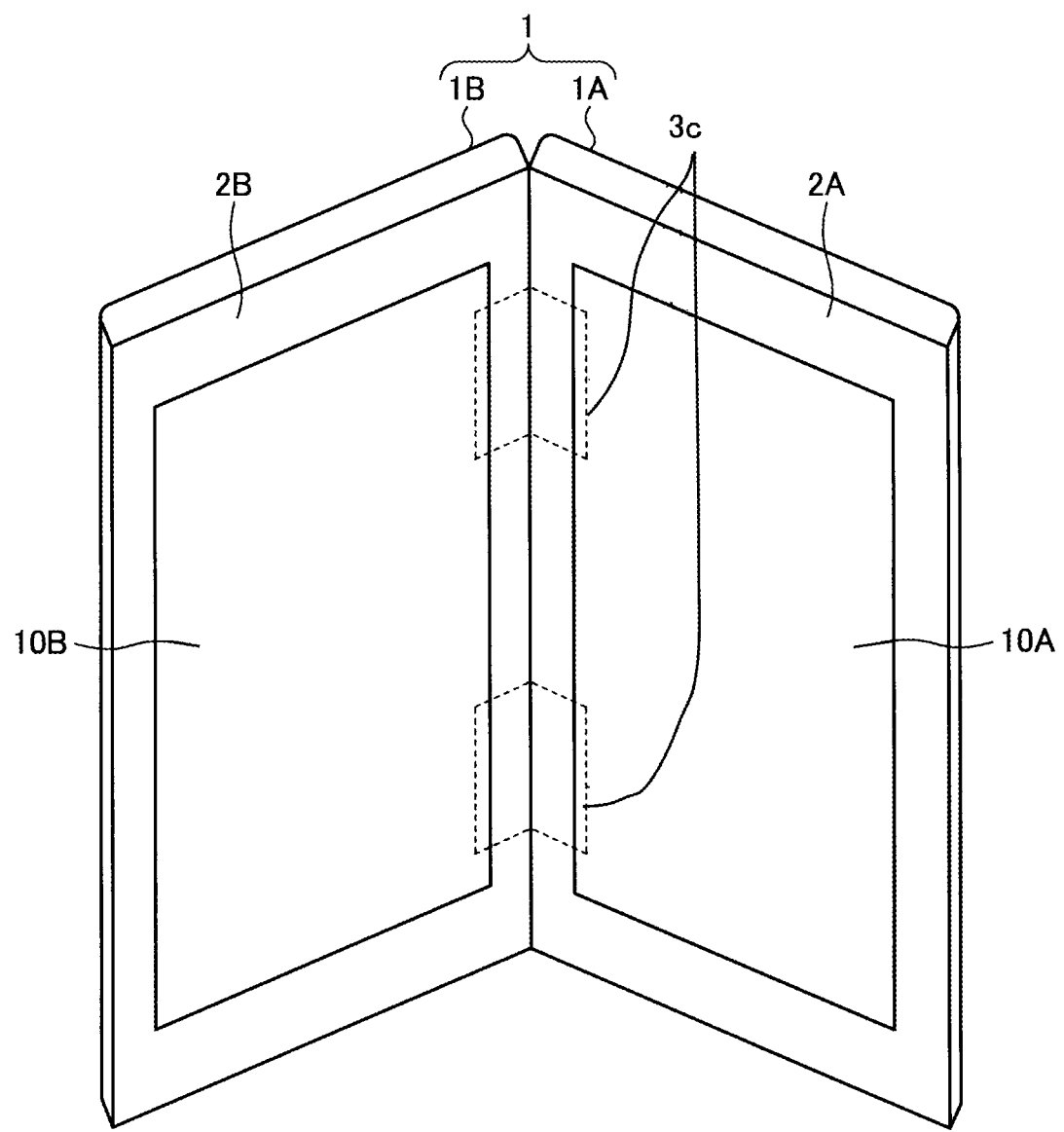
FIG. 24 illustrates an example in which two millimeter-wave band communication antennas are disposed on a flexible substrate forming a connection between the first body and the second body.
Figure 25:
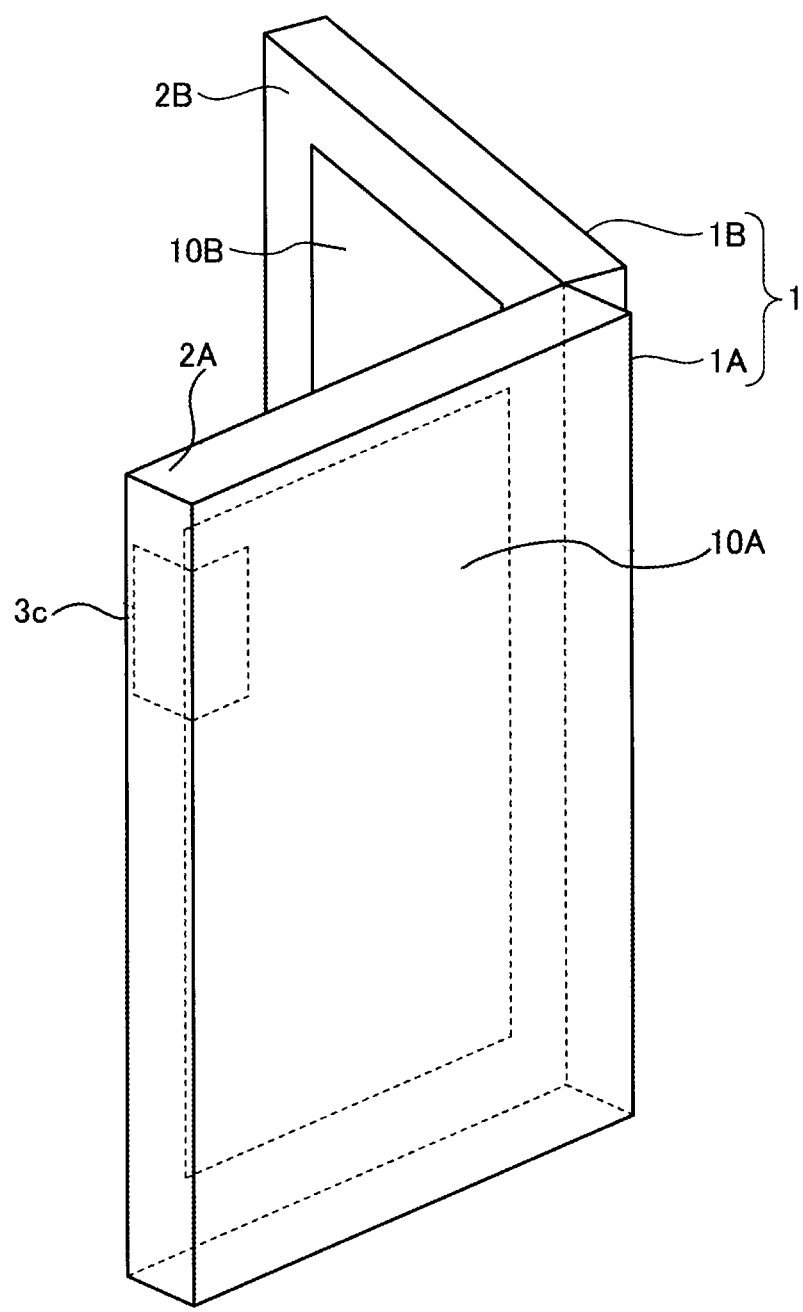
FIG. 25 illustrates an example in which one millimeter-wave band communication antenna is provided in a corner portion of the first body.

FIGS. 23 to 25 illustrate example layouts of one or more millimeter-wave band communication antennas 3c.

FIG. 23 illustrates an example in which one millimeter-wave band communication antenna is disposed on a flexible substrate forming a connection between the first body and the second body. FIG. 24 illustrates an example in which two millimeter-wave band communication antennas are disposed on a flexible substrate forming a connection between the first body and the second body. FIG. 25 illustrates an example in which one millimeter-wave band communication antenna is provided in a corner portion of the first body.

Although FIGS. 23 and 24 illustrate examples in which one or two millimeter-wave band communication antennas 3c are disposed on the flexible substrate forming a connection between the first body 1A and the second body 1B, the number of millimeter-wave band communication antennas 3c on the flexible substrate forming a connection between the first body 1A and the second body 1B is not limited to one as in FIG. 23 or to two as in FIG. 24. For example, three or more millimeter-wave band communication antennas 3c may be provided.

Although FIG. 25 illustrates an example in which one millimeter-wave band communication antenna 3c is provided in the corner portion of the first body 1A, the number of the millimeter-wave band communication antennas 3c in the corner portion of the first body 1A is not limited to one as in FIG. 25. For example, two or more millimeter-wave band communication antennas 3c may be provided. One or more millimeter-wave band communication antennas 3c may be provided in a corner portion of the second body 1B.

Embodiment 4

Figure 26A:
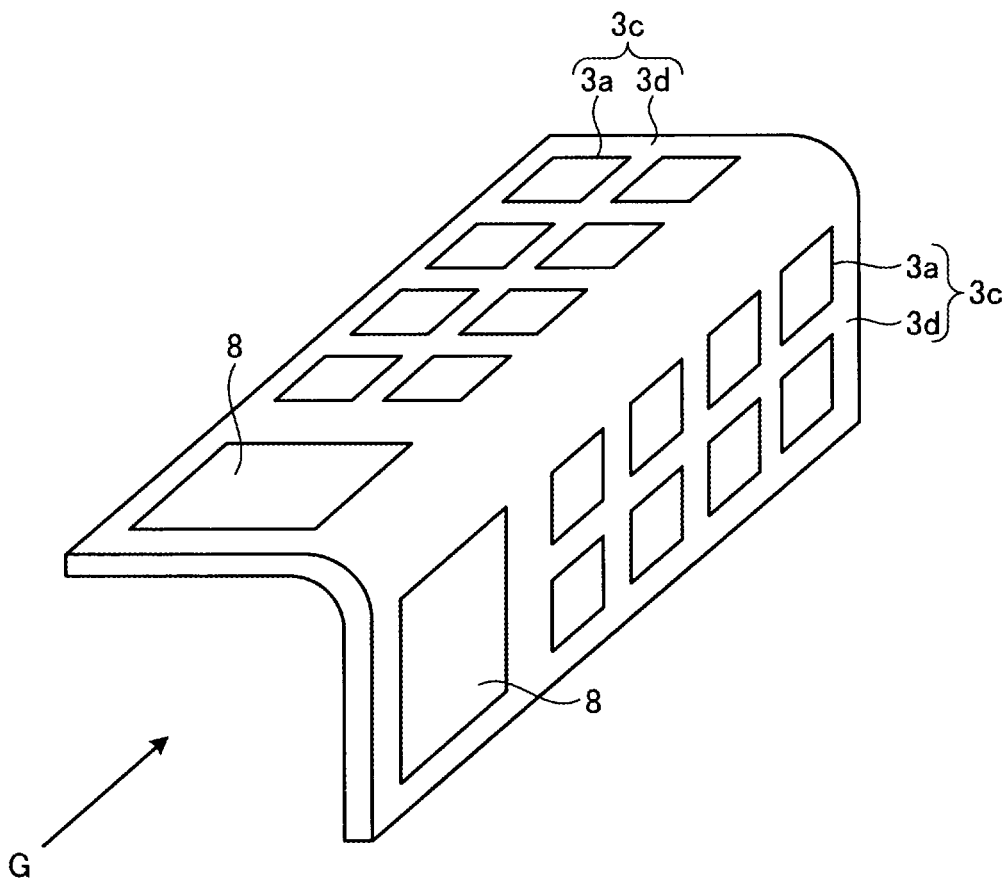
FIG. 26A is a view of exemplary RF modules in the communication device according to Embodiment 4.
Figure 26B:
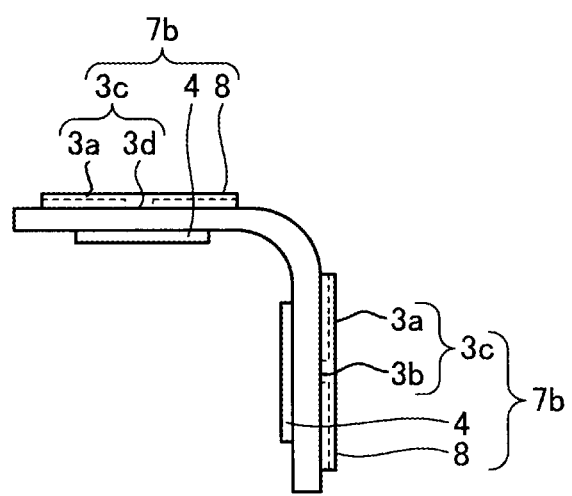
FIG. 26B is a view of the RF modules illustrated in FIG. 26A and seen in the direction of the arrow G.

FIG. 26A is a view of exemplary RF modules in a communication device according to Embodiment 4. FIG. 26B is a view of the RF modules illustrated in FIG. 26A and seen in the direction of the arrow G.

As illustrated in FIG. 26A, each of the millimeter-wave band communication antennas 3c in the present embodiment is an array antenna including the patch antennas 3a arranged on the surface of the flexible substrate 3d. Each patch antenna 3a is a radiation conductor disposed on the surface of the flexible substrate 3d, which is so flexible that it can be bent as desired.

As illustrated in FIG. 26B, the RFICs 4 are disposed on the back surface of the flexible substrate 3d, that is, the RFICs 4 are disposed on the surface opposite to the surface on which the patch antennas 3a are disposed.

In the present embodiment, an RF module 7b is constructed in such a manner that an obstacle detection sensor 8 is disposed on the surface on which the patch antennas 3a are disposed.

The obstacle detection sensor 8 is, for example, an ultrasonic sensor. Alternatively, the obstacle detection sensor 8 may be, for example, an infrared sensor. Still alternatively, the obstacle detection sensor 8 may be an ultrasonic sensor, an infrared sensor, a radio wave sensor, or a variety of combinations of two or more of these sensors. An antenna may serve as a radio wave sensor when the voltage standing wave ratio (VSWR) at the input port of the antenna exceeds or falls below a threshold value. In this case, the millimeter-wave band communication antenna 3c may also be served as a sensor. Alternatively, another antenna may be provided to serve as a sensor.

The obstacle detection sensor 8 detects an obstacle (e.g., a desk, a hand) located in the radiation direction of the millimeter-wave band communication antenna 3c. When the obstacle detection sensor 8 detects an obstacle, the RFIC 4 emits no radio waves from the millimeter-wave band communication antenna 3c. This means that millimeter-wave band communication is stopped. As a result, unnecessary power consumption may be reduced.

Although FIGS. 26A and 26B illustrate an example in which the millimeter-wave band communication antenna 3c, the RFIC 4, and the obstacle detection sensor 8 are combined into the RF module 7b, it is not always required that the millimeter-wave band communication antenna 3c and the RFIC 4 be combined into one unit. Although the patch antennas 3a of each millimeter-wave band communication antenna 3c illustrated in FIGS. 26A and 26B are arranged in a two-by-four matrix, the matrix size of the patch antennas 3a may be varied. The patch antennas 3a illustrated in FIGS. 26A and 26B are disposed on the surface of the flexible substrate 3d. Alternatively, the patch antennas 3a may be arranged on the surface of the dielectric substrate 3b described in Embodiment 1 and may be provided with the obstacle detection sensor 8.

Embodiment 5

Figure 27:
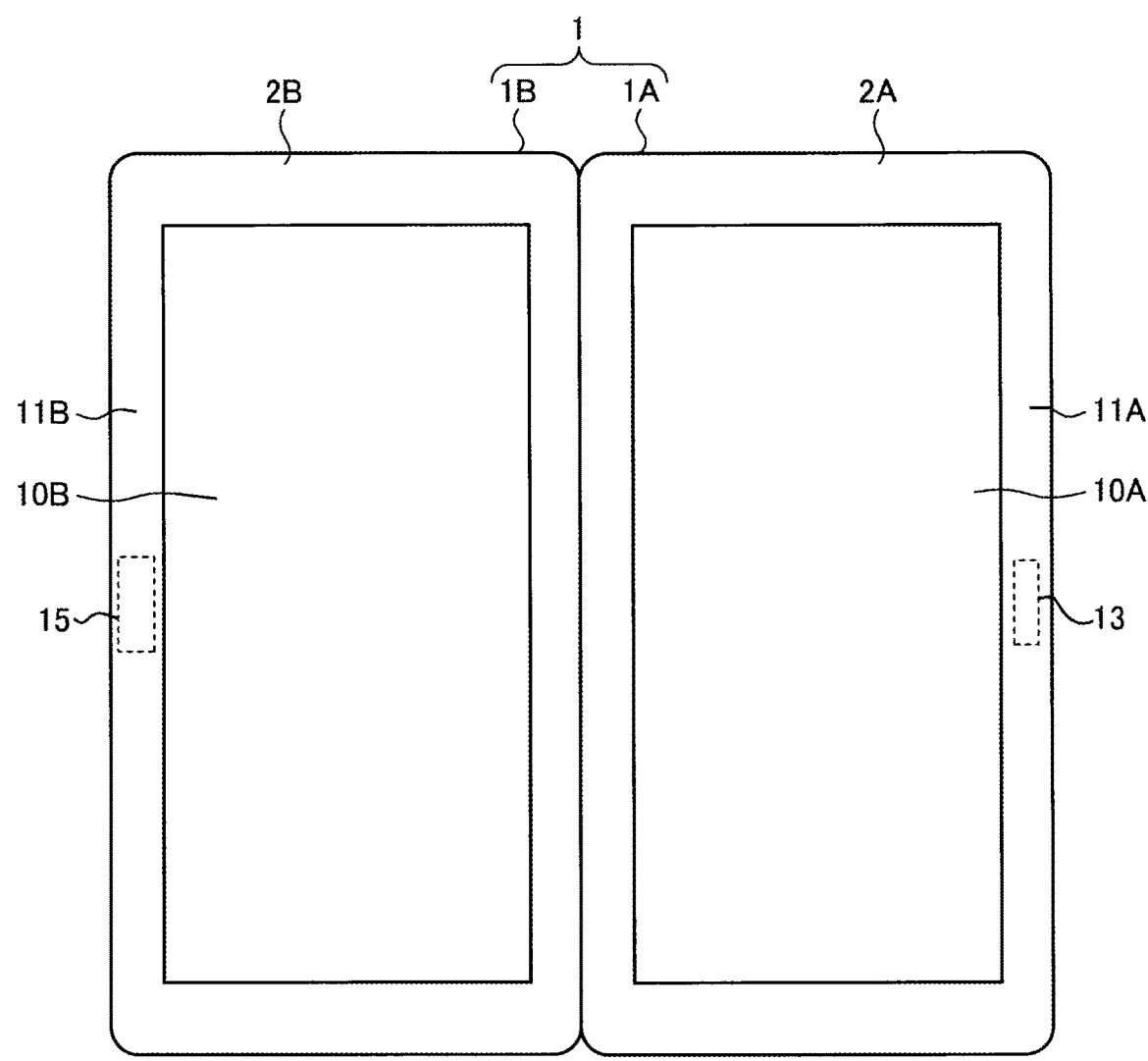
FIG. 27 is a plan view of a communication device according to Embodiment 5, illustrating a first example layout of a sensor.
Figure 28:
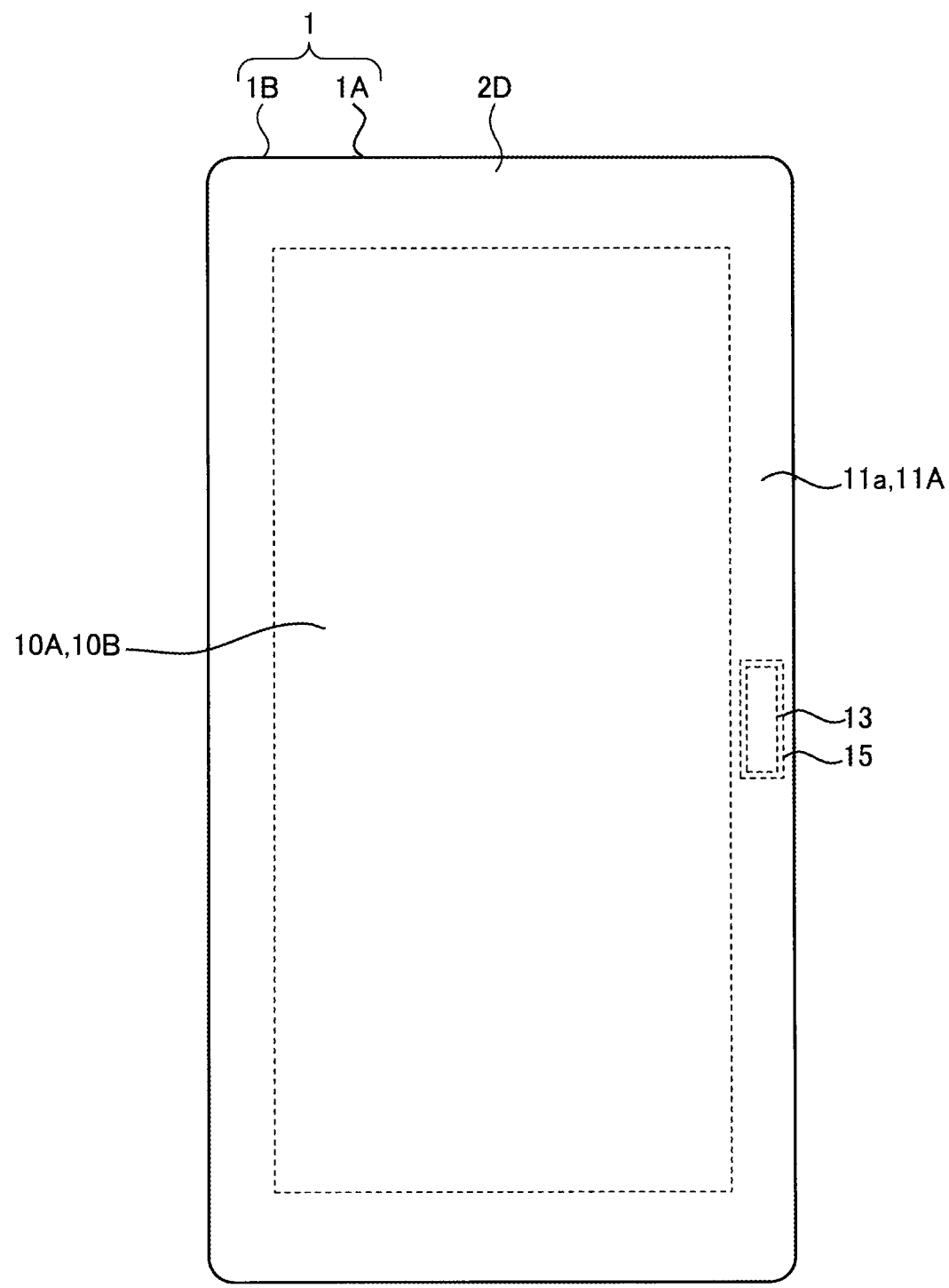
FIG. 28 is a plan view of the communication device in FIG. 27, illustrating the back surface of the second body of the communication device in the folded state.
Figure 29:
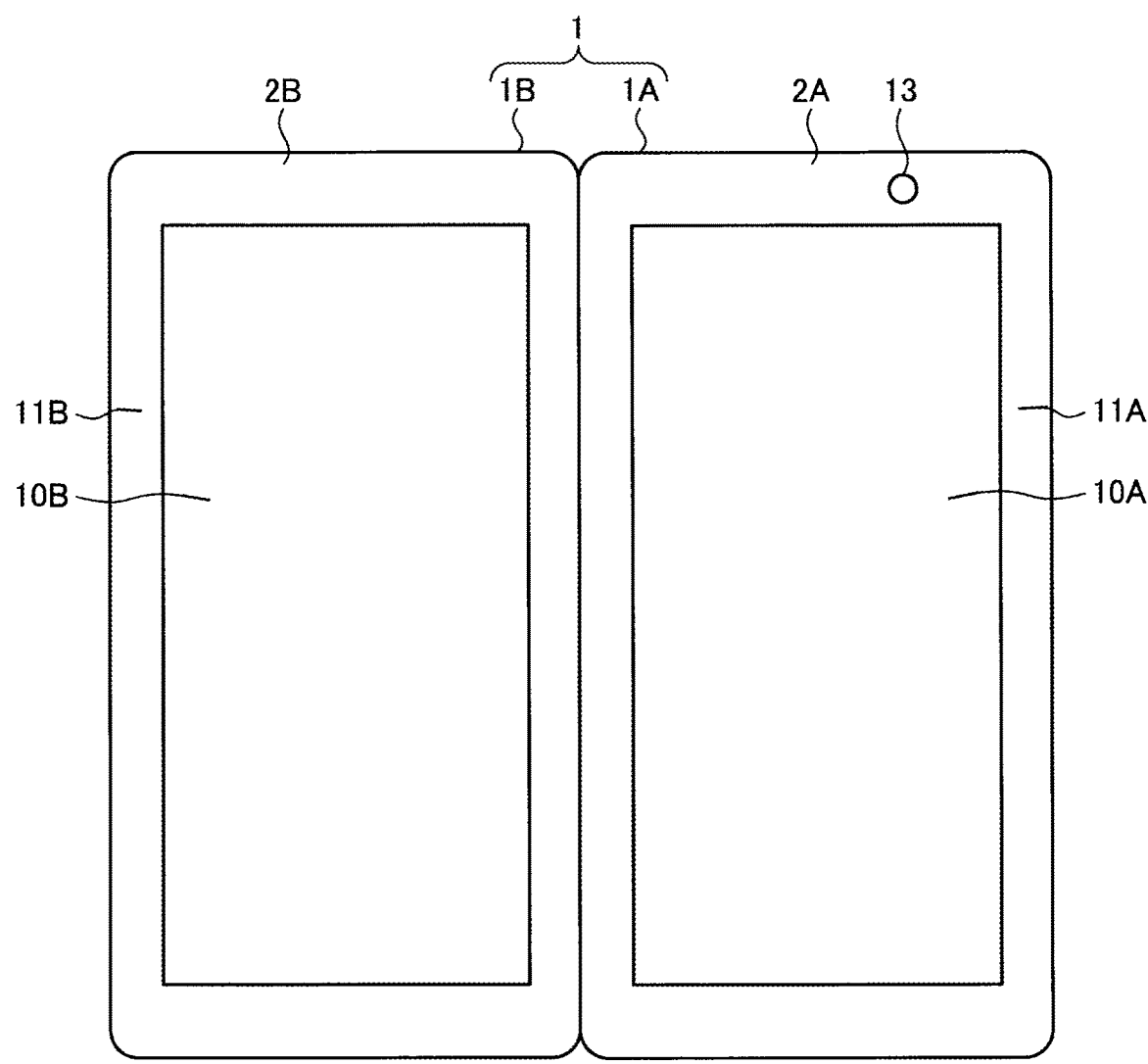
FIG. 29 is a plan view of the communication device according to Embodiment 5, illustrating a second example layout of the sensor.
Figure 30:
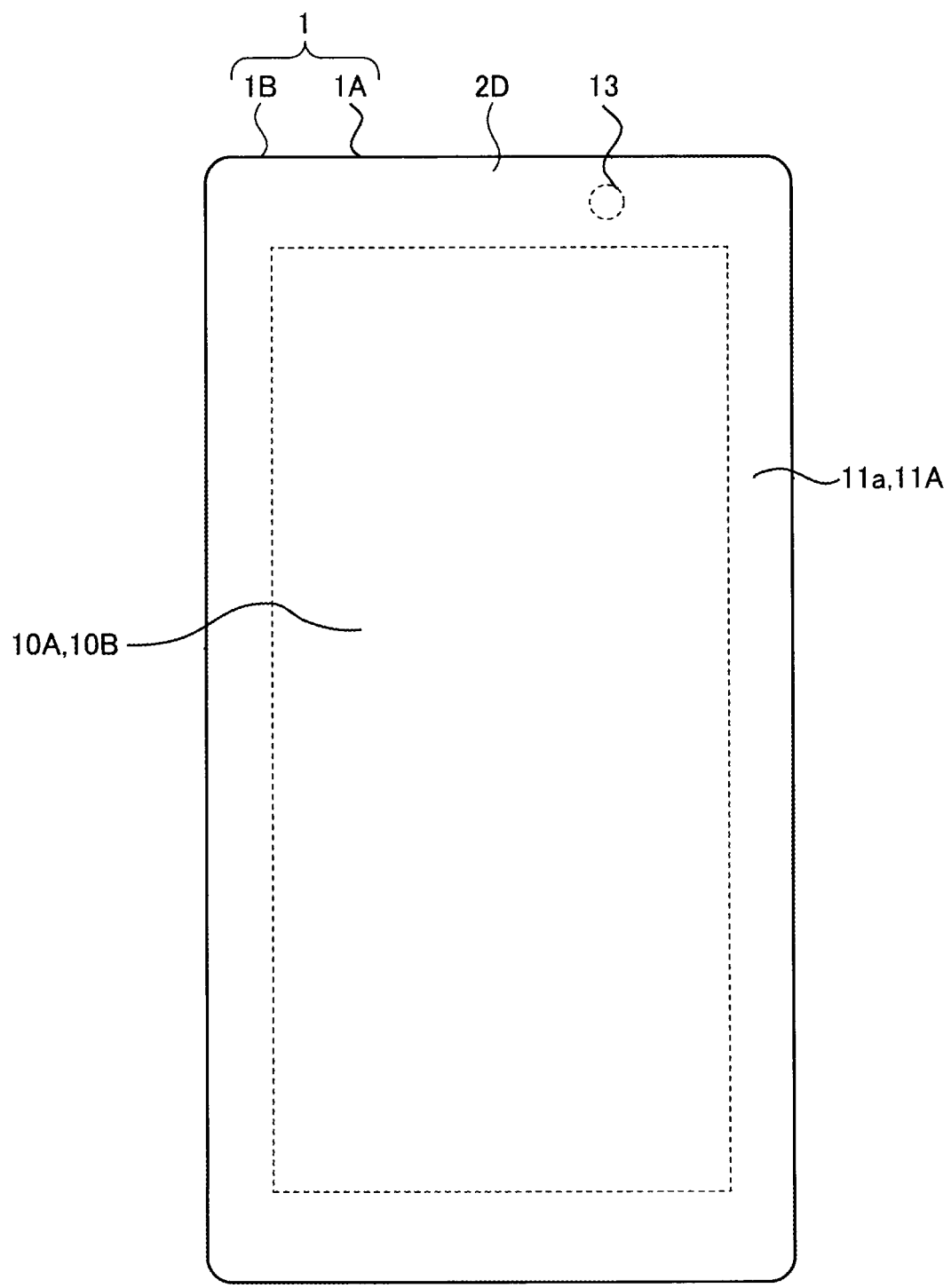
FIG. 30 is a plan view of the communication device in FIG. 29, illustrating the back surface of the second body of the communication device in the folded state.

The sensor 13 in the communication device 1 according to Embodiment 5 will be described below with reference to FIGS. 27 to 30. FIG. 27 is a plan view of the communication device according to Embodiment 5, illustrating a first example layout of the sensor. FIG. 28 is a plan view of the communication device in FIG. 27, illustrating the back surface of the second body of the communication device in the folded state. FIG. 29 is a plan view of the communication device according to Embodiment 5, illustrating a second example layout of the sensor. FIG. 30 is a plan view of the communication device in FIG. 29, illustrating the back surface of the second body of the communication device in the folded state.

The sensor 13 in the first example layout in FIG. 27 is a magnetic sensor embedded in the first frame region 11A of the first body 1A. When the communication device 1 is folded as in FIG. 28, the sensor 13 detects the magnetism of a magnet 15 embedded in the the second frame region 11B of the second body 1B and thus senses the folded state of the communication device 1.

The sensor 13 in the second example layout in FIG. 29 is a proximity sensor embedded in the first frame region 11A of the first body 1A. When the communication device 1 is folded as in FIG. 30, the sensor 13 senses that the second display surface 2B of the second body 1B is close to the sensor 13 and thus senses the folded state of the communication device 1.

The sensor 13 is not limited to the magnetic sensor or the proximity sensor and may be any sensor that can sense the folded state of the communication device 1.

When the sensor 13 senses the folded state of the communication device 1, the communication device 1 causes the communication circuit 100 for 5G to stop carrying out the millimeter-wave band communication while letting the communication circuits 200, 300, 400, 500, and 600 keep carrying out communication. Thus, the communication device 1 carries out the millimeter-wave band communication when the need to do so arises, that is, only while the user keeps the communication device 1 unfolded. This leads to a reduction in power consumption and to extended battery life.

Since the communication device 1 carries out millimeter-wave band communication only when the communication device 1 is unfolded, one or more millimeter-wave band communication antennas 3 provided in the first frame region 11A or the second frame region 11B as in FIG. 20 or 21 can function appropriately.

The embodiments above have been described to facilitate the understanding of the present disclosure and should not be construed as limiting the scope of the present disclosure. The present disclosure may be altered and/or improved without departing from the spirit of the present disclosure and embraces equivalents thereof. Although the exemplary millimeter-wave band communication antenna in the embodiments above includes an array of patch antennas, the millimeter-wave band communication antenna may be a dipole antenna or a slot antenna or may be a combination of both.

The present disclosure may be implemented as described above or as follows.

(1) A communication device according to an aspect of the present disclosure includes: a first body including a first display portion; a second body including a second display portion; a communication circuit that carries out millimeter-wave band communication; and one or more millimeter-wave band communication antennas provided in at least one of the first body and the second body.

This configuration offers a high degree of flexibility in the layout of the one or more millimeter-wave band communication antennas and eases the constraints on the number of millimeter-wave band communication antennas to be provided. This will be detailed below in (2) to (11). This configuration also offers a high degree of flexibility in the layout of the patch antennas constituting the one or more millimeter-wave band communication antennas and enables precise beamforming accordingly. Thus, the performance of the communication circuit for millimeter-wave band communication may be fully exploited in the communication device.

(2) In the communication device described above in (1), at least one of the one or more millimeter-wave band communication antennas is preferably provided in a back surface of the first body.

(3) In the communication device described above in (1) or (2), at least one of the one or more millimeter-wave band communication antennas is preferably provided in a back surface of the second body.

(4) In the communication device described above in any one of (1) to (3), at least one of the one or more millimeter-wave band communication antennas is preferably provided in a top surface of the first body.

(5) In the communication device described above in any one of (1) to (4), at least one of the one or more millimeter-wave band communication antennas is preferably provided in a top surface of the second body.

(6) In the communication device described above in any one of (1) to (5), at least one of the one or more millimeter-wave band communication antennas is preferably provided in a bottom surface of the first body.

(7) In the communication device described above in any one of (1) to (6), at least one of the one or more millimeter-wave band communication antennas is preferably provided in a bottom surface of the second body.

(8) In the communication device described above in any one of (1) to (7), at least one of the one or more millimeter-wave band communication antennas is preferably provided in a side surface of the first body.

(9) In the communication device described above in any one of (1) to (8), at least one of the one or more millimeter-wave band communication antennas is preferably provided in a side surface of the second body.

(10) In the communication device described above in any one of (1) to (9), at least one of the one or more millimeter-wave band communication antennas is preferably provided in a display surface of the first body, the first display portion being provided in the display surface of the first body.

(11) In the communication device described above in any one of (1) to (10), at least one of the one or more millimeter-wave band communication antennas is preferably provided in a display surface of the second body, the second display portion being provided in the display surface of the second body.

(12) In the communication device described above in any one of (1) to (11), at least one of the one or more millimeter-wave band communication antennas is preferably provided in a corner portion of the first body or a corner portion of of the second body.

(13) In the communication device described above in any one of (1) to (12), the communication circuit preferably carries out communication under a multiple-input multiple-output (MIMO) scheme through the millimeter-wave band communication antennas.

This configuration enhances the communication speed of the millimeter-wave band communication.

(14) In the communication device described above in any one of (1) to (12), the communication circuit preferably carries out communication under a diversity scheme through the millimeter-wave band communication antennas.

This configuration enhances the communication speed and the reliability of the millimeter-wave band communication.

(15) The communication device described above in any one of (1) to (14) preferably includes an obstacle detection sensor that detects an obstacle located in a radiation direction of the one or more millimeter-wave band communication antennas, and the communication circuit preferably stops the millimeter-wave band communication when the obstacle detection sensor detects an obstacle.

This configuration reduces unnecessary power consumption.

(16) In the communication device described above in any one of (1) to (15), the communication circuit preferably stops the millimeter-wave band communication when the communication device is folded in such a manner that the first display portion of the first body faces the second display portion of the second body.

With this configuration, the communication device carries out the millimeter-wave band communication when the need to do so arises, that is, only while the user keeps the communication device unfolded. This leads to a reduction in power consumption and to extended battery life.

The present disclosure is conducive to a communication device in which the performance of a communication circuit for millimeter-wave band communication may be fully exploited.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:
1. A communication device comprising:
a first body including a first display portion;
a second body including a second display portion;
a communication circuit configured to carry out millimeter-wave band communication; and one or more millimeter-wave band communication antennas provided in at least one of the first body and the second body,
wherein at least one of the one or more millimeter-wave band communication antennas is on a bent-flexible substrate on a corner of at least two surfaces of the first body or the second body.

2. The communication device according to claim 1, wherein at least one of the one or more millimeter-wave band communication antennas is provided in a back surface of the first body.

3. The communication device according to claim 2, wherein at least one of the one or more millimeter-wave band communication antennas is provided in a back surface of the second body.

4. The communication device according to claim 2, wherein at least one of the one or more millimeter-wave band communication antennas is provided in a top surface of the first body.

5. The communication device according to claim 2, wherein at least one of the one or more millimeter-wave band communication antennas is provided in a top surface of the second body.

6. The communication device according to claim 1, wherein at least one of the one or more millimeter-wave band communication antennas is provided in a back surface of the second body.

7. The communication device according to claim 6, wherein at least one of the one or more millimeter-wave band communication antennas is provided in a top surface of the first body.

8. The communication device according to claim 1, wherein at least one of the one or more millimeter-wave band communication antennas is provided in a top surface of the first body.

9. The communication device according to claim 1, wherein at least one of the one or more millimeter-wave band communication antennas is provided in a top surface of the second body.

10. The communication device according to claim 1, wherein at least one of the one or more millimeter-wave band communication antennas is provided in a bottom surface of the first body.

11. The communication device according to claim 1, wherein at least one of the one or more millimeter-wave band communication antennas is provided in a bottom surface of the second body.

12. The communication device according to claim 1, wherein at least one of the one or more millimeter-wave band communication antennas is provided in a side surface of the first body.

13. The communication device according to claim 1, wherein at least one of the one or more millimeter-wave band communication antennas is provided in a side surface of the second body.

14. The communication device according to claim 1, wherein at least one of the one or more millimeter-wave band communication antennas is provided in a display surface of the first body, the first display portion being provided in the display surface of the first body.

15. The communication device according to claim 1, wherein at least one of the one or more millimeter-wave band communication antennas is provided in a display surface of the second body, the second display portion being provided in the display surface of the second body.

16. The communication device according to claim 1, wherein the communication circuit is configured to carry out communication under a multiple-input multiple-output scheme through the millimeter-wave band communication antennas.

17. The communication device according to claim 1, wherein the communication circuit is configured to carry out communication under a diversity scheme through the millimeter-wave band communication antennas.

18. The communication device according to claim 1, further comprising an obstacle detection sensor configured to detect an obstacle located in a radiation direction of the one or more millimeter-wave band communication antennas,
wherein the communication circuit is configured to stop the millimeter-wave band communication when the obstacle detection sensor detects an obstacle.

19. The communication device according to claim 1, wherein the communication circuit is configured to stop the millimeter-wave band communication when the communication device is folded in such a manner that the first display portion of the first body faces the second display portion of the second body.

20. The communication device according to claim 1, wherein the bent-flexible substrate forms a connection between the first body and the corner portion of the second body.

21. The communication device according to claim 1, wherein the bent-flexible substrate hinges between the first display portion and the second display portion.

22. The communication device according to claim 1, wherein:
the bent-flexible substrate has at least a first surface and a second surface,
the first surface faces a first direction, the second surface faces a second direction, the second direction being different from the first direction,
a first antenna of the one or more millimeter-wave band communication antennas is on the first surface,
a second antenna of the one or more millimeter-wave band communication antennas is on the second surface,
the first antenna faces the first direction and the second antenna faces the second direction, and
the first direction is perpendicular to the second direction.

23. The communication device according to claim 22, wherein a radiation direction of the first antenna is different from a radiation direction of the second antenna.

* * * * *